US012556665B2

(12) United States Patent
Inoue et al.

(10) Patent No.: US 12,556,665 B2
(45) Date of Patent: Feb. 17, 2026

(54) CONTROL DEVICE, CONTROL METHOD, CONTROL PROGRAM, AND SYSTEM

(71) Applicant: FUJIFILM Corporation, Tokyo (JP)

(72) Inventors: Kazuki Inoue, Saitama (JP); Kazuki Ishida, Saitama (JP); Masahiko Miyata, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/949,731

(22) Filed: Nov. 15, 2024

(65) Prior Publication Data

US 2025/0080702 A1 Mar. 6, 2025

Related U.S. Application Data

(63) Continuation of application No. PCT/JP2023/015649, filed on Apr. 19, 2023.

(30) Foreign Application Priority Data

May 18, 2022 (JP) .................................. 2022-081604

(51) Int. Cl.
*H04N 9/31* (2006.01)

(52) U.S. Cl.
CPC ................................ *H04N 9/3105* (2013.01)

(58) Field of Classification Search
CPC ...... H04N 9/3105; H04N 5/74; H04N 9/3147; H04N 9/3179; G06F 3/0481; G06F 3/14; G06T 19/00

See application file for complete search history.

(56) References Cited

U.S. PATENT DOCUMENTS

| | | | |
|---|---|---|---|
| 2010/0265177 A1 | 10/2010 | Fujimoto et al. | |
| 2012/0032977 A1 | 2/2012 | Kim et al. | |
| 2015/0309578 A1 | 10/2015 | Mccoy et al. | |
| 2018/0089805 A1* | 3/2018 | Fujimori | G06F 3/0482 |
| 2021/0158605 A1 | 5/2021 | Kamikubo et al. | |
| 2022/0305913 A1* | 9/2022 | Nara | B60K 35/23 |

(Continued)

FOREIGN PATENT DOCUMENTS

| | | |
|---|---|---|
| JP | 2013-530462 A | 7/2013 |
| JP | 5299054 B2 | 9/2013 |

(Continued)

OTHER PUBLICATIONS

International Preliminary Report on Patentability and Written Opinion of the International Searching Authority (Forms PCT/IB/326, PCT/IB/373, and PCT/ISA/237) for International Application No. PCT/JP2023/015649, dated Nov. 28, 2024, with an English translation.

(Continued)

*Primary Examiner* — James M Pontius
(74) *Attorney, Agent, or Firm* — Birch, Stewart, Kolasch & Birch, LLP

(57) ABSTRACT

A control device includes a processor. The processor is configured to: cause a second image including a first image with which content is associated to be projected from a projection apparatus; acquire playback information regarding playback of the content via an information terminal; and change a display aspect of the first image in the second image based on the playback information.

13 Claims, 22 Drawing Sheets

(56) References Cited

U.S. PATENT DOCUMENTS

| | | | | |
|---|---|---|---|---|
| 2023/0161468 A1* | 5/2023 | Yoshida | ............. | G06F 3/04847 345/650 |
| 2023/0314918 A1* | 10/2023 | Endo | ................. | G03B 21/2006 353/122 |
| 2024/0103790 A1* | 3/2024 | Kokubo | ............... | G06F 1/1639 |

FOREIGN PATENT DOCUMENTS

| | | |
|---|---|---|
| JP | 2015-65612 A | 4/2015 |
| JP | 6292478 B2 | 3/2018 |
| JP | 2019-61453 A | 4/2019 |
| JP | 6559190 B2 | 8/2019 |
| JP | 6695833 B2 | 5/2020 |
| JP | 6706977 B2 | 6/2020 |
| JP | 2021-60829 A | 4/2021 |
| WO | WO 2018/216402 A1 | 11/2018 |

OTHER PUBLICATIONS

International Search Report (Form PCT/ISA/210) for International Application No. PCT/JP2023/015649, dated Jul. 25, 2023, with an English translation.

* cited by examiner

PLAYBACK INFORMATION

CONTROL DEVICE, CONTROL METHOD, CONTROL PROGRAM, AND SYSTEM

CROSS-REFERENCE TO RELATED APPLICATIONS

This is a continuation of International Application No. PCT/JP2023/015649 filed on Apr. 19, 2023, and claims priority from Japanese Patent Application No. 2022-081604 filed on May 18, 2022, the entire content of which is incorporated herein by reference.

BACKGROUND OF THE INVENTION

1. Field of the Invention

The present invention relates to a control device, a control method, a computer-readable storage medium that stores a control program, and a system.

2. Description of the Related Art

JP2013-530462A discloses that in a method for augmented reality, a real world image including a marker is generated, the marker is detected from the real world image, an object image corresponding to the detected marker is combined with the real world image, and the combined image is displayed.

JP2019-061453A discloses an information processing apparatus that performs, in a case where, in an image in which a real space including a display region in which a product is not displayed is imaged, a product image is superimposed and displayed on the display region in the real space and a user performs a first action with respect to the product image superimposed and displayed in the real space, processing for ordering a product corresponding to the product image.

JP2015-065612A discloses an image processing device that recognizes that a specific object is framed in a screen of a display unit and that, in a case where the number of times of recognition of the framing-in matches a preset number of times of recognition, performs predetermined display according to the number of times of recognition.

JP2021-060829A discloses a mobile terminal apparatus that images an imprint including a name and a marker disposed in a peripheral portion of the name, extracts an imprint image from the captured image, extracts the marker included in the imprint from the imprint image, and selects and generates a generated image associated with the extracted marker from a generated image database.

SUMMARY OF THE INVENTION

One embodiment according to a technology of the present disclosure provides a control device, a control method, a computer-readable storage medium that stores a control program, and a system that can change visibility of an image with which content is associated according to a playback status of the content.

(1)
A control device comprising a processor,
in which the processor is configured to:
cause a second image including a first image with which content is associated to be projected from a projection apparatus;
acquire playback information regarding playback of the content via an information terminal; and
change a display aspect of the first image in the second image based on the playback information.

(2)
The control device according to (1),
in which the change of the display aspect of the first image is a process for changing visibility of the first image.

(3)
The control device according to (2),
in which the change of the display aspect of the first image is a process for reducing the visibility of the first image.

(4)
The control device according to (2),
in which the change of the display aspect of the first image is a process for increasing the visibility of the first image.

(5)
The control device according to any one of (1) to (4),
in which the playback information is information regarding the number of playback of the content.

(6)
The control device according to (5),
in which the information regarding the number of playback of the content includes information indicating the number of times one or more information terminals have played the content.

(7)
The control device according to (5) or (6),
in which the information regarding the number of playback of the content includes information indicating the number of information terminals that have performed the playback of the content.

(8)
The control device according to any one of (5) to (7),
in which the information regarding the number of playback of the content includes information indicating the number of information terminals that are simultaneously playing the content.

(9)
The control device according to any one of (5) to (8),
in which the second image includes an image representing the information regarding the number of playback of the content.

(10)
The control device according to any one of (1) to (9),
in which the first image includes a plurality of first images that are playable in different information terminals, and the processor is configured to acquire the playback information for the plurality of first images.

(11)
A control method executed by a processor of a control device, the method comprising:
causing a second image including a first image with which content is associated to be projected from a projection apparatus;
acquiring playback information regarding playback of the content via an information terminal; and
changing a display aspect of the first image in the second image based on the playback information.

(12)
A non-transitory computer-readable storage medium that stores a control program for causing a processor of a control device to execute a process, the process comprising:
causing a second image including a first image with which content is associated to be projected from a projection apparatus;
acquiring playback information regarding playback of the content via an information terminal; and changing a display aspect of the first image in the second image based on the playback information.

(13)

A system comprising:

a control device configured to cause a second image including a first image with which content is associated to be projected from a projection apparatus, acquire playback information regarding playback of the content via an information terminal, and change a display aspect of the first image in the second image based on the playback information;

the projection apparatus; and the information terminal.

According to the present invention, it is possible to provide a control device, a control method, a computer-readable storage medium that stores a control program, and a system that can change visibility of an image with which content is associated according to a playback status of the content.

DESCRIPTION OF THE PREFERRED EMBODIMENTS

Hereinafter, an example of an embodiment of the present invention will be described with reference to the drawings.

Embodiment

System 100 of Embodiment

Figure 1:
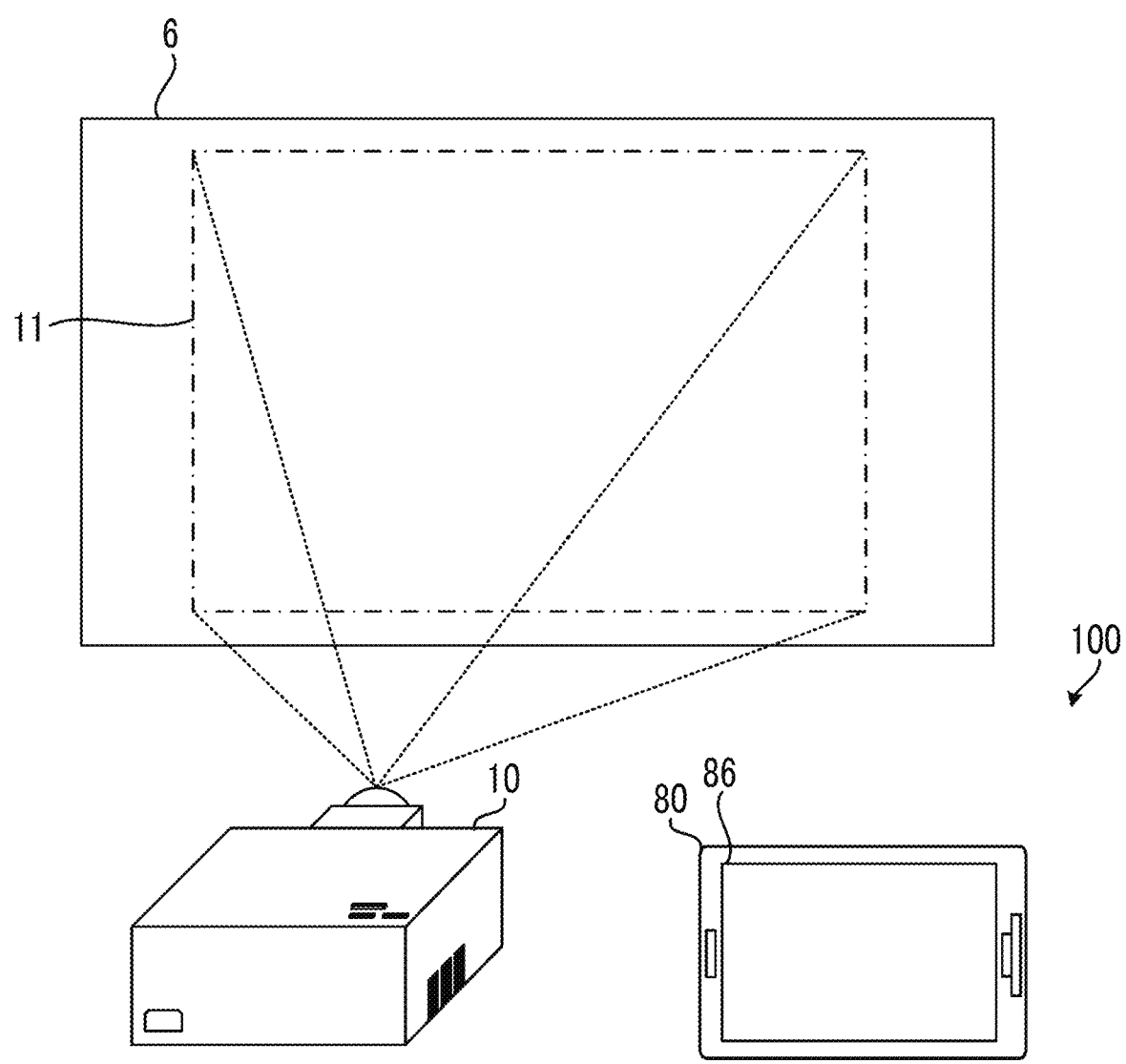
FIG. 1 is a diagram showing an example of a system 100 of an embodiment.

FIG. 1 is a diagram showing an example of a system 100 of an embodiment. As shown in FIG. 1, the system 100 includes a projection apparatus 10 and an information terminal 80. A control device according to the embodiment of the present invention is applied to, for example, the projection apparatus 10. The projection apparatus 10 is a projection apparatus capable of performing projection to a projection target object 6.

A projection target object 6 is an object such as a screen or a wall having a projection surface on which a projection image is displayed by the projection apparatus 10. In the example shown in FIG. 1, the projection surface of the projection target object 6 is a rectangular plane. It is assumed that upper, lower, left, and right sides of the projection target object 6 in FIG. 1 are upper, lower, left, and right sides of the actual projection target object 6.

A projection range 11 shown by a one dot chain line is a region irradiated with projection light by the projection apparatus 10, in the projection target object 6. The projection range 11 is a part or the entirety of a projectable range within which the projection can be performed by the projection apparatus 10. In the example shown in FIG. 1, the projection range 11 is rectangular.

The information terminal 80 is an information terminal, such as a smartphone or a tablet terminal, including an imaging unit (for example, an imaging module 85 in FIG. 6) and a display unit 86. An application that causes the display unit 86 to display, in a case where a specific marker image is included in a captured image obtained by the imaging unit, a superimposition image in which predetermined augmented reality (AR) content is superimposed on the captured image is stored (installed) in the information terminal 80.

<Configuration of Projection Apparatus 10>

Figure 2:
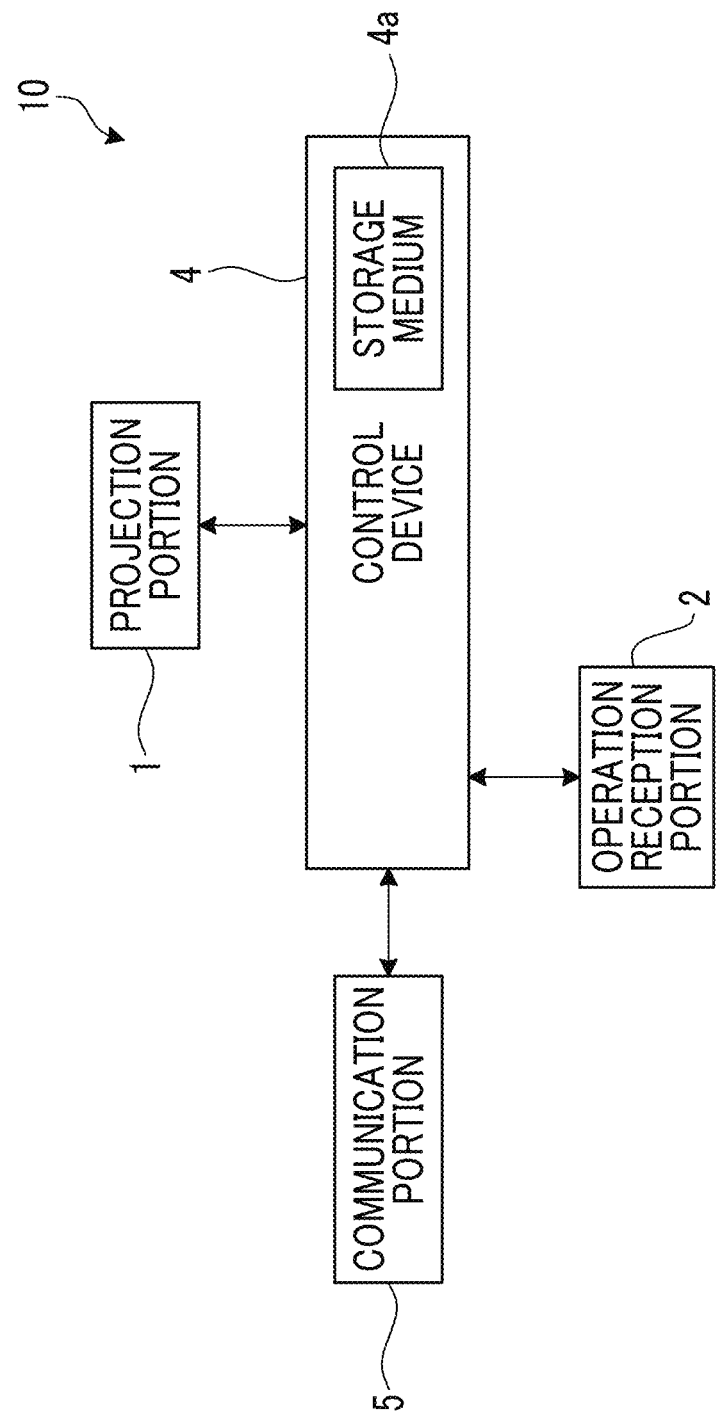
FIG. 2 is a diagram showing an example of a configuration of a projection apparatus 10.

FIG. 2 is a diagram showing an example of a configuration of the projection apparatus 10. As shown in FIG. 2, the projection apparatus 10 comprises, for example, a projection portion 1, a control device 4, and an operation reception portion 2. The projection apparatus 10 may further comprise a communication portion 5. The projection portion 1 is composed of, for example, a liquid crystal projector or a projector using liquid crystal on silicon (LCOS). Hereinafter, the projection portion 1 will be described as a liquid crystal projector.

The control device 4 is an example of a control device according to the embodiment of the present invention. The control device 4 controls projection performed by the projection apparatus 10. The control device 4 is a device including a controller composed of various processors, a communication interface (not shown) for communicating with each unit, and a storage medium 4a such as a hard disk, a solid state drive (SSD), or a read-only memory (ROM) and integrally controls the projection portion 1. Examples of the various processors of the controller of the control device 4 include a central processing unit (CPU) that is a generalpurpose processor performing various types of processing by executing a program, a programmable logic device (PLD) such as a field programmable gate array (FPGA) that is a processor having a circuit configuration changeable after manufacture, or a dedicated electric circuit such as an application specific integrated circuit (ASIC) that is a processor having a circuit configuration dedicatedly designed to execute specific processing.

More specifically, a structure of these various processors is an electric circuit in which circuit elements such as semiconductor elements are combined. The controller of the control device 4 may be composed of one of the various processors or may be composed of a combination of two or more processors of the same type or different types (for example, a combination of a plurality of FPGAs or a combination of a CPU and an FPGA).

The operation reception portion 2 detects an instruction from a user (user instruction) by receiving various operations from the user. The operation reception portion 2 may be a button, a key, a joystick, or the like provided in the control device 4 or may be a reception unit or the like that receives a signal from a remote controller that performs remote control of the control device 4.

The communication portion 5 is a communication interface capable of communicating with another device. The communication portion 5 may be a wired communication interface that performs wired communication, or may be a wireless communication interface that performs wireless communication.

Figure 4:
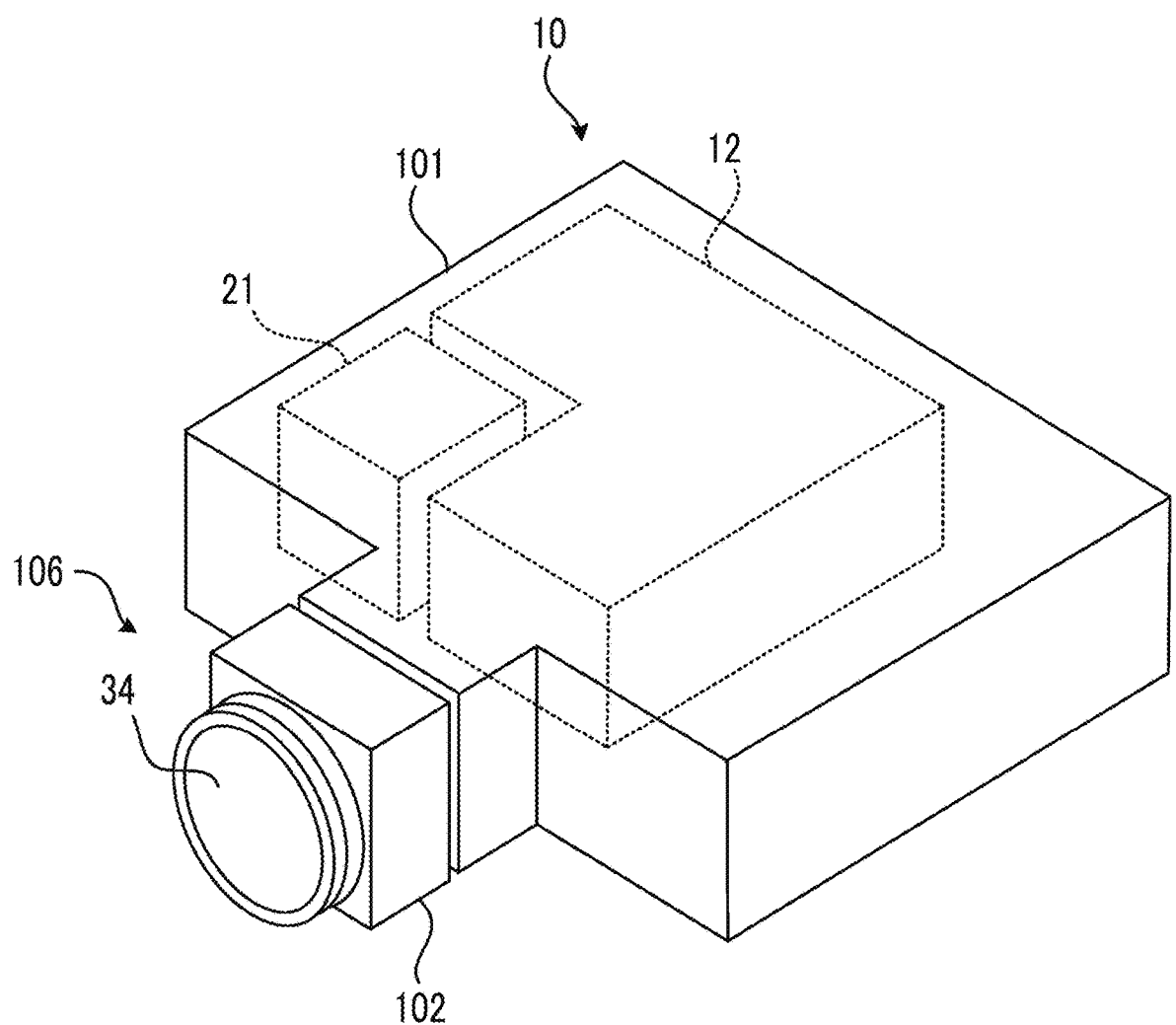
FIG. 4 is a diagram showing an example of an exterior configuration of the projection apparatus 10.
Figure 5:
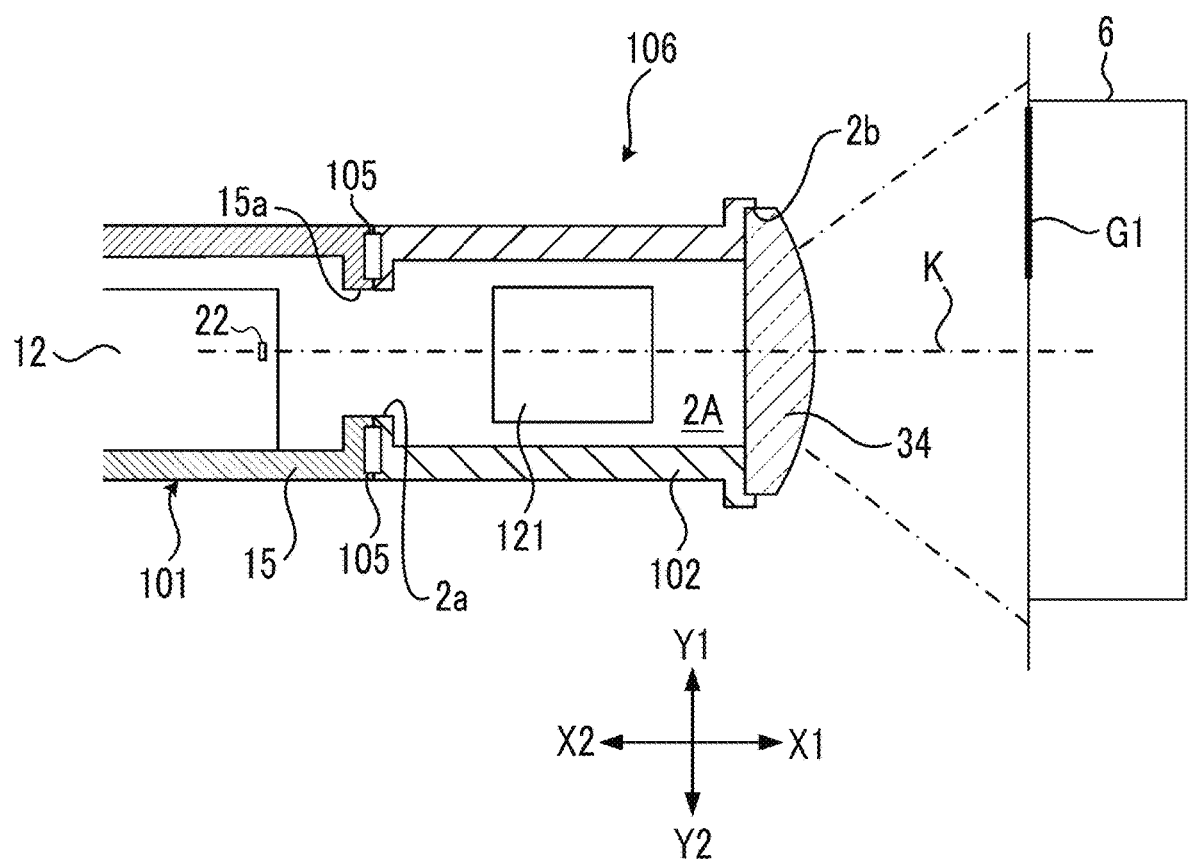
FIG. 5 is a schematic cross-sectional view of a part of an optical unit 106 of the projection apparatus 10 shown in FIG. 4.

It should be noted that the projection portion 1, the control device 4, the operation reception portion 2, and the communication portion 5 are implemented by, for example, one device (for example, refer to FIGS. 4 and 5). Alternatively, the projection portion 1, the control device 4, the operation reception portion 2, and the communication portion 5 may be implemented by a plurality of devices that can cooperate by performing communication with each other.

<Internal Configuration of Projection Portion 1>

Figure 3:
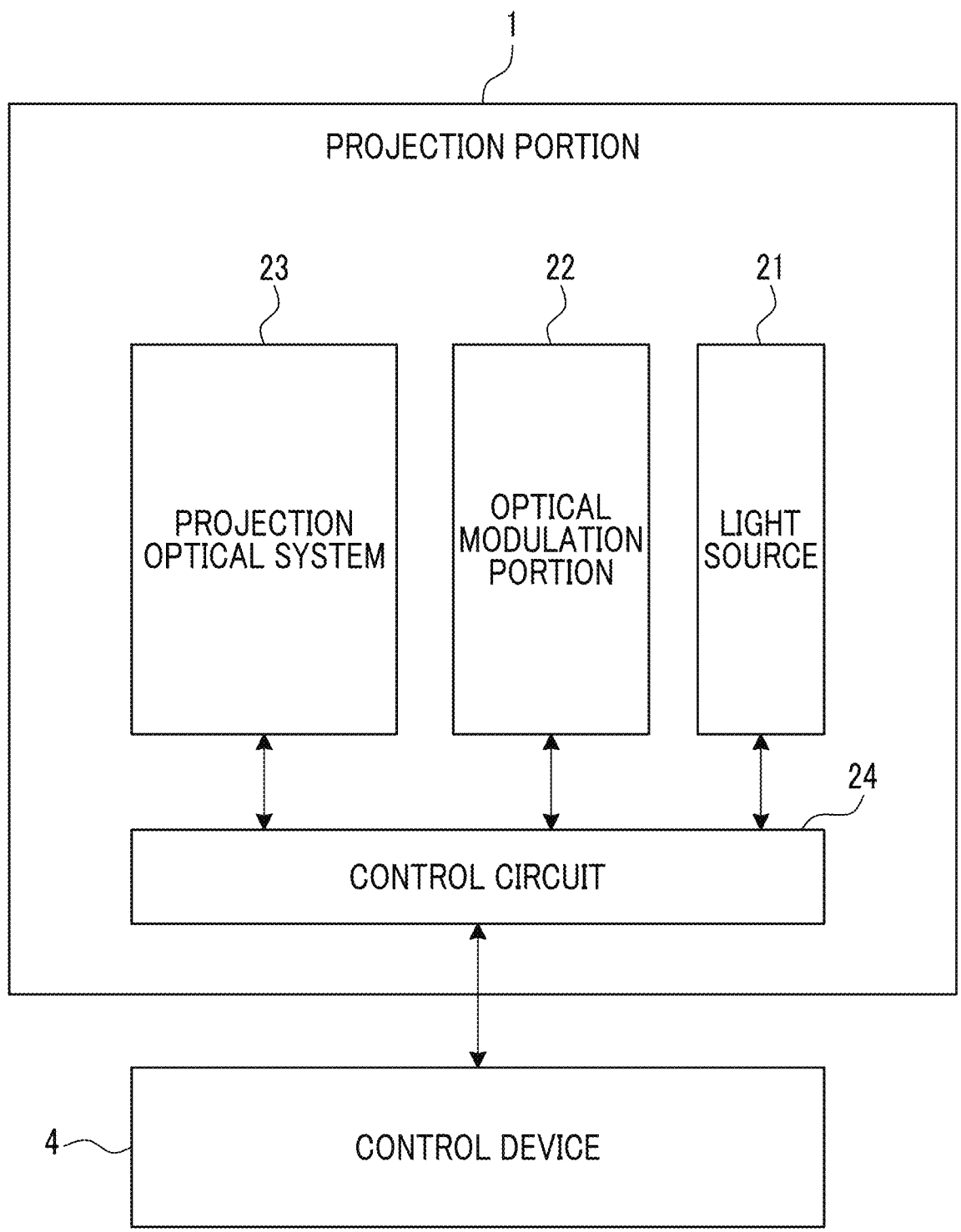
FIG. 3 is a schematic diagram showing an example of an internal configuration of a projection portion 1.

FIG. 3 is a schematic diagram showing an example of an internal configuration of the projection portion 1. As shown in FIG. 3, the projection portion 1 of the projection apparatus 10 shown in FIG. 2 comprises a light source 21, an optical modulation portion 22, a projection optical system 23, and a control circuit 24. The light source 21 includes a light emitting element such as a laser or a light emitting diode (LED) and emits, for example, white light.

The optical modulation portion 22 is composed of three liquid crystal panels (optical modulation elements) that emit each color image by modulating, based on image information, light of each color which is emitted from the light source 21 and separated into three colors, red, blue, and green, by a color separation mechanism, not shown, and a dichroic prism that mixes color images emitted from the three liquid crystal panels and that emits the mixed color image in the same direction. Each color image may be emitted by respectively mounting filters of red, blue, and green in the three liquid crystal panels and modulating the white light emitted from the light source 21 via each liquid crystal panel.

The light from the light source 21 and the optical modulation portion 22 is incident on the projection optical system 23. The projection optical system 23 includes at least one lens and is composed of, for example, a relay optical system. The light that has passed through the projection optical system 23 is projected to the projection target object 6.

In the projection target object 6, a region irradiated with the light transmitted through the entire range of the optical modulation portion 22 is the projectable range within which the projection can be performed by the projection portion 1. In the projectable range, a region irradiated with the light actually transmitted through the optical modulation portion 22 is the projection range 11 of the projection portion 1. For example, in the projectable range, a size, a position, and a shape of the projection range of the projection portion 1 are changed by controlling a size, a position, and a shape of a region through which the light is transmitted in the optical modulation portion 22.

The control circuit 24 controls the light source 21, the optical modulation portion 22, and the projection optical system 23 based on display data input from the control device 4 to project an image based on the display data to the projection target object 6. The display data input into the control circuit 24 is composed of three pieces of data including red display data, blue display data, and green display data.

In addition, the control circuit 24 enlarges or reduces a projection range of the projection portion 1 by changing the projection optical system 23 based on a command input from the control device 4. In addition, the control device 4 may move the projection range of the projection portion 1 by changing the projection optical system 23 based on an operation received by the operation reception portion 2 from the user.

In addition, the projection apparatus 10 comprises a shift mechanism that mechanically or optically moves the projection range of the projection portion 1 while maintaining an image circle of the projection optical system 23. The image circle of the projection optical system 23 is a region in which the projection light incident on the projection optical system 23 appropriately passes through the projection optical system 23 in terms of light fall-off, color separation, edge part curvature, and the like.

The shift mechanism is implemented by at least any one of an optical system shift mechanism that performs optical system shifting, or an electronic shift mechanism that performs electronic shifting.

The optical system shift mechanism is, for example, a mechanism (for example, refer to FIGS. 5 and 20) that moves the projection optical system 23 in a direction perpendicular to an optical axis, or a mechanism that moves the optical modulation portion 22 in the direction perpendicular to the optical axis instead of moving the projection optical system 23. In addition, the optical system shift mechanism may perform the movement of the projection optical system 23 and the movement of the optical modulation portion 22 in combination with each other.

The electronic shift mechanism is a mechanism that performs pseudo shifting of the projection range by changing a range through which the light is transmitted in the optical modulation portion 22.

In addition, the projection apparatus 10 may comprise a projection direction changing mechanism that moves the image circle of the projection optical system 23 and the projection range. The projection direction changing mechanism is a mechanism that changes a projection direction of the projection portion 1 by changing an orientation of the projection portion 1 via mechanical rotation (for example, refer to FIG. 20).

<Mechanical Configuration of Projection Apparatus 10>

FIG. 4 is a diagram showing an example of an exterior configuration of the projection apparatus 10. FIG. 5 is a schematic cross-sectional view of a part of the optical unit 106 of the projection apparatus 10 shown in FIG. 4. FIG. 5 shows a cross section in a plane along an optical path of light emitted from a body part 101 shown in FIG. 4.

As shown in FIG. 4, the projection apparatus 10 comprises the body part 101 and the optical unit 106 that is provided to protrude from the body part 101. In the configuration shown in FIG. 4, the operation reception portion 2; the control device 4; the light source 21, the optical modulation portion 22, and the control circuit 24 in the projection portion 1; and the communication portion 5 are provided in the body part 101. The projection optical system 23 in the projection portion 1 is provided in the optical unit 106.

The optical unit 106 comprises a first member 102 supported by the body part 101. The optical unit 106 may be configured to be attachable to and detachable from the body part 101 (in other words, configured to be interchangeable).

As shown in FIG. 5, the body part 101 includes a housing 15 in which an opening 15a for passing light is formed in a part connected to the optical unit 106.

As shown in FIG. 4, the light source 21 and an optical modulation unit 12 including the optical modulation portion 22 (refer to FIG. 3) that generates an image by spatially modulating the light emitted from the light source 21 based on input image data are provided inside the housing 15 of the body part 101. The light emitted from the light source 21 is incident on the optical modulation portion 22 of the optical modulation unit 12 and is spatially modulated and emitted by the optical modulation portion 22.

As shown in FIG. 5, the image formed by the light spatially modulated by the optical modulation unit 12 is incident on the optical unit 106 by passing through the opening 15a of the housing 15 and is projected to the projection target object 6. Accordingly, an image G1 is visible from an observer.

As shown in FIG. 5, the optical unit 106 comprises the first member 102 having a hollow portion 2A connected to an inside of the body part 101, a first optical system 121 disposed in the hollow portion 2A, a lens 34, and a first shift mechanism 105.

The first member 102 is a member having, for example, a rectangular cross-sectional exterior, in which an opening 2a and an opening 2b are formed in surfaces parallel to each other. The first member 102 is supported by the body part 101 in a state where the opening 2a is disposed at a position facing the opening 15a of the body part 101. The light emitted from the optical modulation portion 22 of the optical modulation unit 12 of the body part 101 is incident into the hollow portion 2A of the first member 102 through the opening 15a and the opening 2a.

An incidence direction of the light incident into the hollow portion 2A from the body part 101 will be referred to as a direction X1. A direction opposite to the direction X1 will be referred to as a direction X2. The direction X1 and the direction X2 will be collectively referred to as a direction X. In addition, a direction from the front to the back of the page of FIG. 5 and its opposite direction will be referred to as a direction Z. In the direction Z, the direction from the front to the back of the page will be referred to as a direction Z1, and the direction from the back to the front of the page will be referred to as a direction Z2.

In addition, a direction perpendicular to the direction X and to the direction Z will be referred to as a direction Y. In the direction Y, an upward direction in FIG. 5 will be referred to as a direction Y1, and a downward direction in FIG. 5 will be referred to as a direction Y2. In the example in FIG. 5, the projection apparatus 10 is disposed such that the direction Y2 is a vertical direction.

The projection optical system 23 shown in FIG. 3 is composed of the first optical system 121 and the lens 34 in the example in FIG. 5. An optical axis K of this projection optical system 23 is shown in FIG. 5. The first optical system 121 and the lens 34 are disposed in this order from an optical modulation portion 22 side along the optical axis K.

The first optical system 121 includes at least one lens and guides the light that is incident on the first member 102 from the body part 101 and that travels in the direction X1 to the lens 34.

The lens 34 closes the opening 2b formed in an end part of the first member 102 on a direction X1 side and is disposed in the end part. The lens 34 projects the light incident from the first optical system 121 to the projection target object 6.

The first shift mechanism 105 is a mechanism for moving the optical axis K of the projection optical system (in other words, the optical unit 106) in a direction (direction Y in FIG. 5) perpendicular to the optical axis K. Specifically, the first shift mechanism 105 is configured to be capable of changing a position of the first member 102 in the direction Y with respect to the body part 101. The first shift mechanism 105 may manually move the first member 102 or electrically move the first member 102.

FIG. 5 shows a state where the first member 102 is moved as far as possible to a direction Y1 side by the first shift mechanism 105. By moving the first member 102 in the direction Y2 via the first shift mechanism 105 from the state shown in FIG. 5, a relative position between a center of the image (in other words, a center of a display surface) formed by the optical modulation portion 22 and the optical axis K changes, and the image G1 projected to the projection target object 6 can be shifted (translated) in the direction Y2.

The first shift mechanism 105 may be a mechanism that moves the optical modulation portion 22 in the direction Y instead of moving the optical unit 106 in the direction Y. Even in this case, the image G1 projected to the projection target object 6 can be moved in the direction Y.

<Hardware Configuration of Information Terminal 80>

Figure 6:
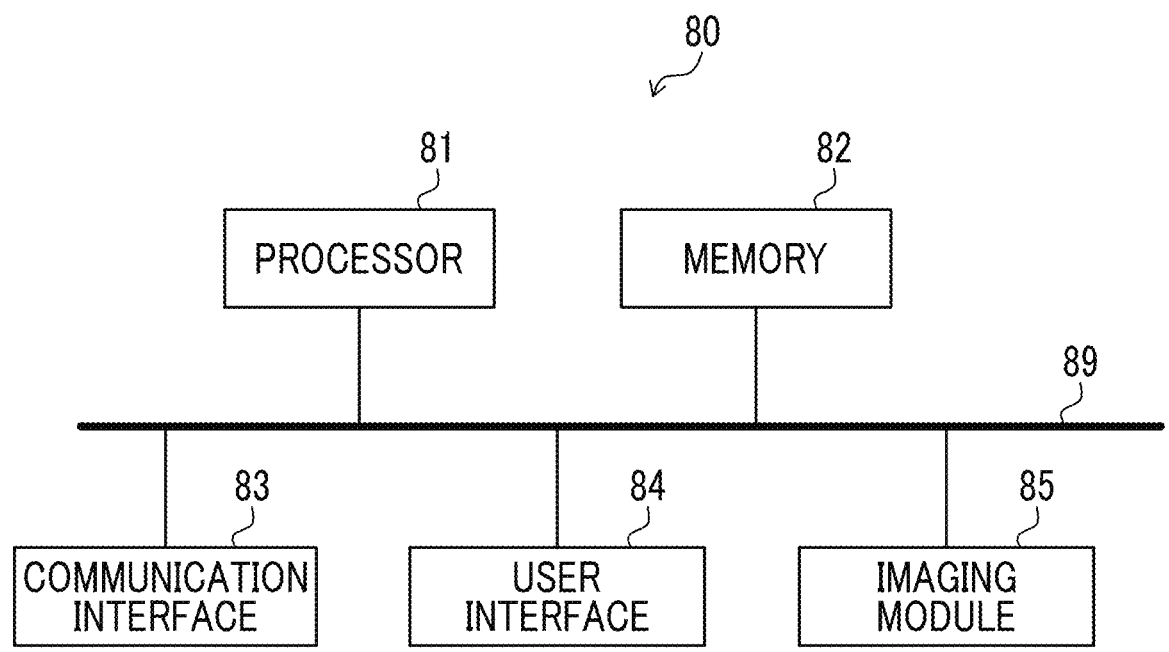
FIG. 6 is a diagram showing an example of a hardware configuration of an information terminal 80.

FIG. 6 is a diagram showing an example of a hardware configuration of the information terminal 80. As shown in FIG. 5, the information terminal 80 shown in FIG. 1 comprises a processor 81, a memory 82, a communication interface 83, a user interface 84, and the imaging module 85. The processor 81, the memory 82, the communication interface 83, the user interface 84, and the imaging module 85 are connected to each other by, for example, a bus 89.

The processor 81 is a circuit that performs signal processing, and is, for example, a CPU that controls the entire information terminal 80. The processor 81 may be implemented by other digital circuits such as an FPGA and a digital signal processor (DSP). In addition, the processor 81 may be implemented by combining a plurality of digital circuits.

The memory 82 includes, for example, a main memory and an auxiliary memory. The main memory is, for example, a random-access memory (RAM). The main memory is used as a work area of the processor 81.

The auxiliary memory is, for example, a non-volatile memory such as a magnetic disk, an optical disc, or a flash memory. Various programs for operating the information terminal 80 are stored in the auxiliary memory. The programs stored in the auxiliary memory are loaded into the main memory and executed by the processor 81.

In addition, the auxiliary memory may include a portable memory that can be attached to and detached from the information terminal 80. Examples of the portable memory include a memory card such as a universal serial bus (USB) flash drive or a secure digital (SD) memory card, and an external hard disk drive.

The communication interface 83 is a communication interface that performs communication with an external device of the information terminal 80. The communication interface 83 is controlled by the processor 81. The communication interface 83 may be a wired communication interface that performs wired communication or a wireless communication interface that performs wireless communication, or may include both of the wired communication interface and the wireless communication interface.

The user interface 84 includes, for example, an input device that receives operation input from a user, and an output device that outputs information to the user. The input device can be implemented by, for example, a pointing device (for example, a mouse), a key (for example, a keyboard), or a remote controller. The output device can be implemented by, for example, a display or a speaker. In addition, the input device and the output device may be implemented by a touch panel or the like. The user interface 84 is controlled by the processor 81. The display unit 86 of the information terminal 80 shown in FIG. 1 is implemented by, for example, a touch panel included in the user interface 84.

The imaging module 85 is an imaging unit including an imaging lens or an imaging element. As the imaging element, for example, a complementary metal-oxide-semiconductor (CMOS) image sensor can be used.

<Image Projection and Playback of Augmented Reality Content>

Figure 7:
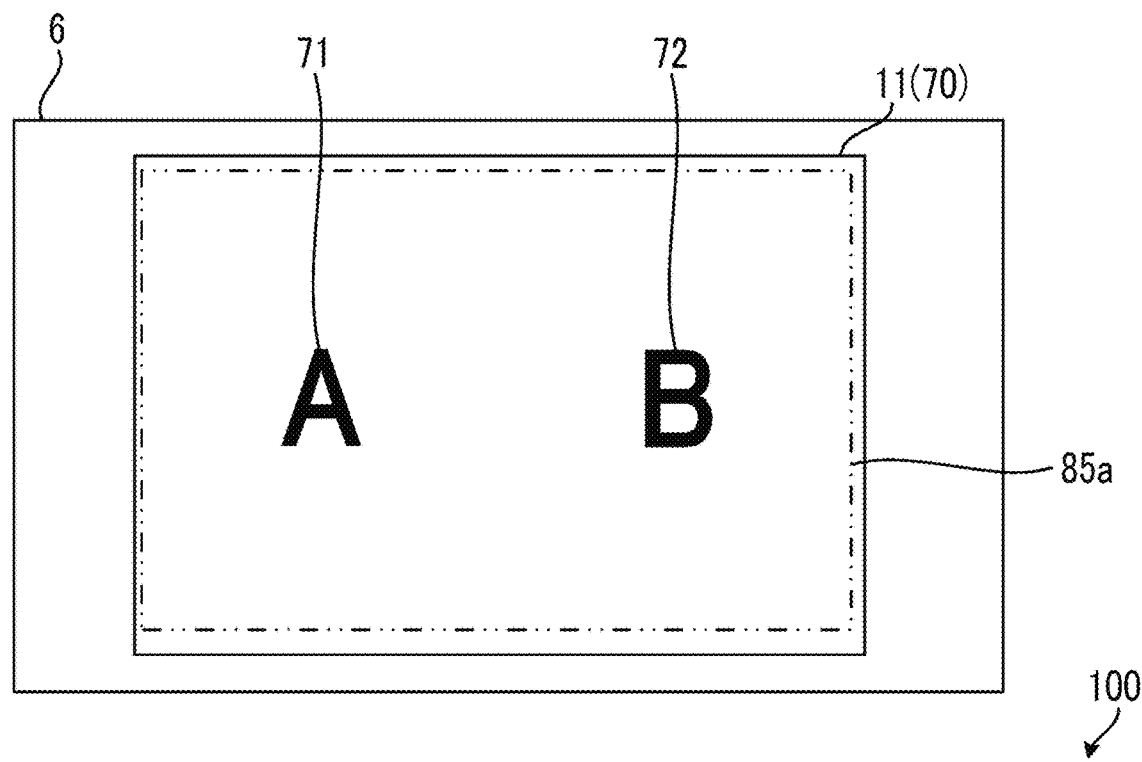
FIG. 7 is a diagram showing an example of image projection and playback of augmented reality content.
Figure 7:
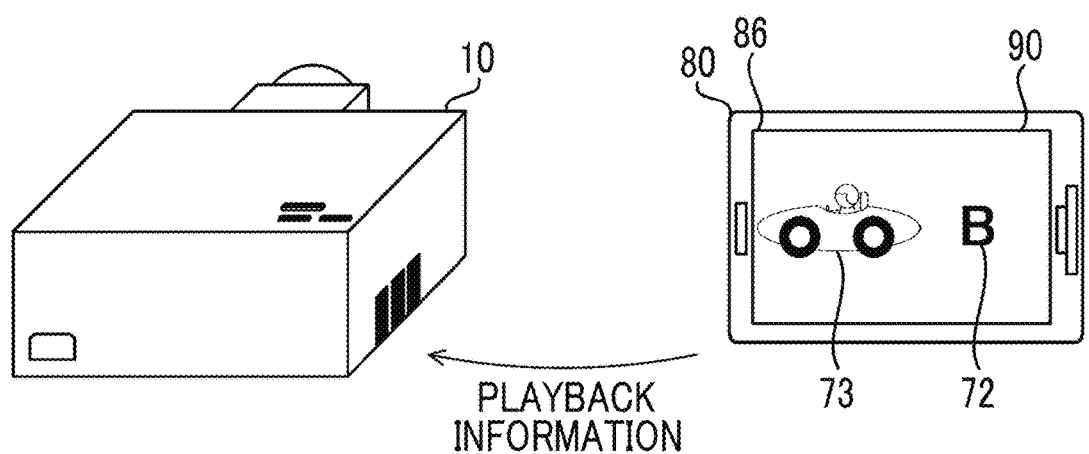

FIG. 7 is a diagram showing an example of image projection and playback of augmented reality content. An image 70 is an image to be projected by the projection apparatus 10. In the example of FIG. 7, the image 70 is an image including a marker image 71 representing "A" and a marker image 72 representing "B". The marker image 71 is an example of a first image with which the content is associated. The image 70 is an example of a second image including the first image with which the content is associated. The control device 4 of the projection apparatus 10 outputs the image data representing the image 70 to the projection portion 1 of the projection apparatus 10. As a result, the image 70 based on the image data is projected to the projection range 11.

An imaging range 85a indicates an imaging range of the imaging module 85 of the information terminal 80. That is, a captured image representing the imaging range 85a in the projection target object 6 is obtained by imaging using the imaging module 85 of the information terminal 80.

An application that causes the display unit 86 to display, in a case where the marker image 71 is included in the captured image obtained by the imaging module 85, a superimposition image 90 in which a content image 73 is superimposed on a position of the marker image 71 in the image, together with the captured image, is stored (installed) in the information terminal 80.

The content image 73 is an example of the content associated with the marker image 71, and in the example of FIG. 7, is a photographic image or an illustration image of a sports car. In addition, in the example of FIG. 7, a range of the image 70 including the marker images 71 and 72 is imaged by the information terminal 80, and the superimposition image 90 in which the content image 73 is superimposed on a part of the marker image 71 of the image 70 is displayed on the display unit 86.

In a case where the information terminal 80 displays the superimposition image 90, that is, in a case where the information terminal 80 displays the content image 73 based on the marker image 71, the information terminal 80 transmits playback information indicating that the content image 73 has been played to the control device 4 (the projection apparatus 10). The transmission of the playback information from the information terminal 80 to the control device 4 is performed, for example, via a network such as the Internet or a local area network (LAN).

The control device 4 receives the playback information about the content image 73 from a plurality of information terminals including the information terminal 80 after the start of the projection of the image 70, and changes the display aspect of the marker image 71 in the image 70 based on the received playback information. The change of the display aspect of the marker image 71 is, for example, a change of the visibility of the marker image 71.

<Processing Performed by Control Device 4>

Figure 8:
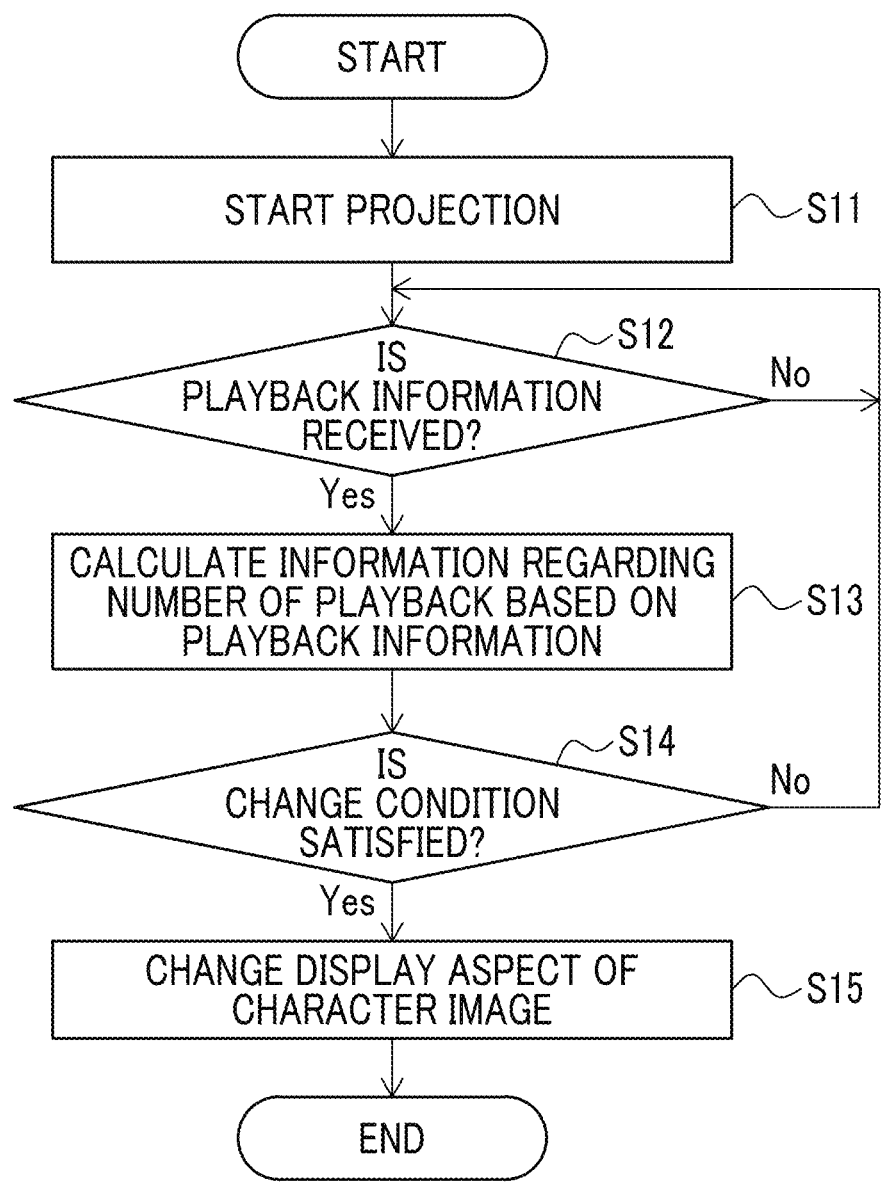
FIG. 8 is a diagram showing an example of processing via a control device 4.

FIG. 8 is a diagram showing an example of processing via the control device 4. For example, the control device 4 executes the processing shown in FIG. 8. First, the control device 4 starts the projection of the image 70 by controlling the projection apparatus 10 (step S11). Next, the control device 4 determines whether or not the playback information for the content image 73 is received from the information terminal such as the information terminal 80 (step S12). In a case where the playback information is not received (step S12: No), the control device 4 executes step S12 again.

In step S12, in a case where the playback information is received (step S12: Yes), the control device 4 calculates the information regarding the number of playback of the content image 73 based on the received playback information (step S13). The information regarding the number of playback of the content image 73 is, for example, the number of times of playback of the content image 73. The number of times of playback of the content image 73 is the total number of times one or more information terminals such as the information terminal 80 have played the content image 73. For example, in a case where the playback information is transmitted for each playback of the content image 73, the control device 4 calculates the number of times the playback information is received after step S11 as the number of times of playback of the content image 73 (information regarding the number of playback).

Next, the control device 4 determines whether or not the information regarding the number of playback of the content image 73 received in step S13 satisfies the change condition for changing the display aspect of the marker image 71 in the image 70 (step S14). For example, in a case where the information regarding the number of playback of the content image 73 is the number of times of playback of the content image 73, the change condition is, for example, that the number of times of playback of the content image 73 exceeds a predetermined number of times. In a case where the information regarding the number of playback of the content image 73 does not satisfy the change condition (step S14: No), the control device 4 returns to step S12.

In step S14, in a case where the information regarding the number of playback of the content image 73 satisfies the change condition (step S14: Yes), the control device 4 changes the display aspect of the marker image 71 in the image 70 (step S15), and ends the series of processing. Specific examples of the change of the display aspect of the marker image 71 will be described later (for example, refer to FIGS. 9 to 14).

First Example of Change of Display Aspect of Marker Image 71

Figure 9:
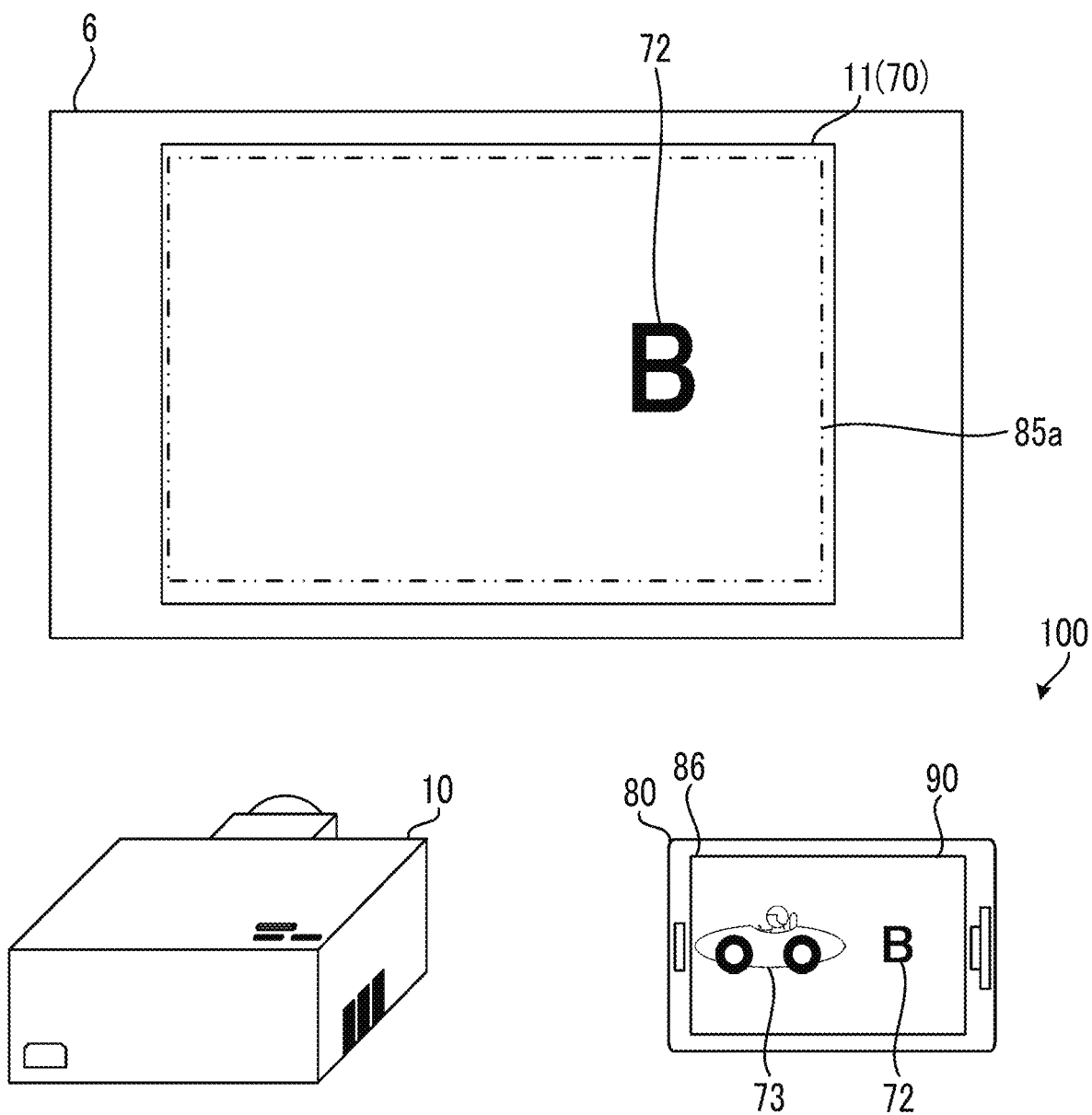
FIG. 9 is a diagram showing a first example of a change of a display aspect of a marker image 71.

FIG. 9 is a diagram showing a first example of the change of the display aspect of the marker image 71. For example, in step S15 of FIG. 8, the control device 4 performs processing of non-displaying the marker image 71 of the image 70 as shown in FIG. 9. This processing is an example of processing of reducing the visibility of the marker image 71.

For example, by non-displaying the marker image 71 in a case where the number of times of playback of the content image 73 exceeds the predetermined number of times, the visibility of the other parts of the image 70 can be increased by non-displaying the marker image 71 that has low necessity because the content image 73 has been sufficiently played and the premium feeling can be created by limiting the number of times the content image 73 can be played.

Second Example of Change of Display Aspect of Marker Image 71

Figure 10:
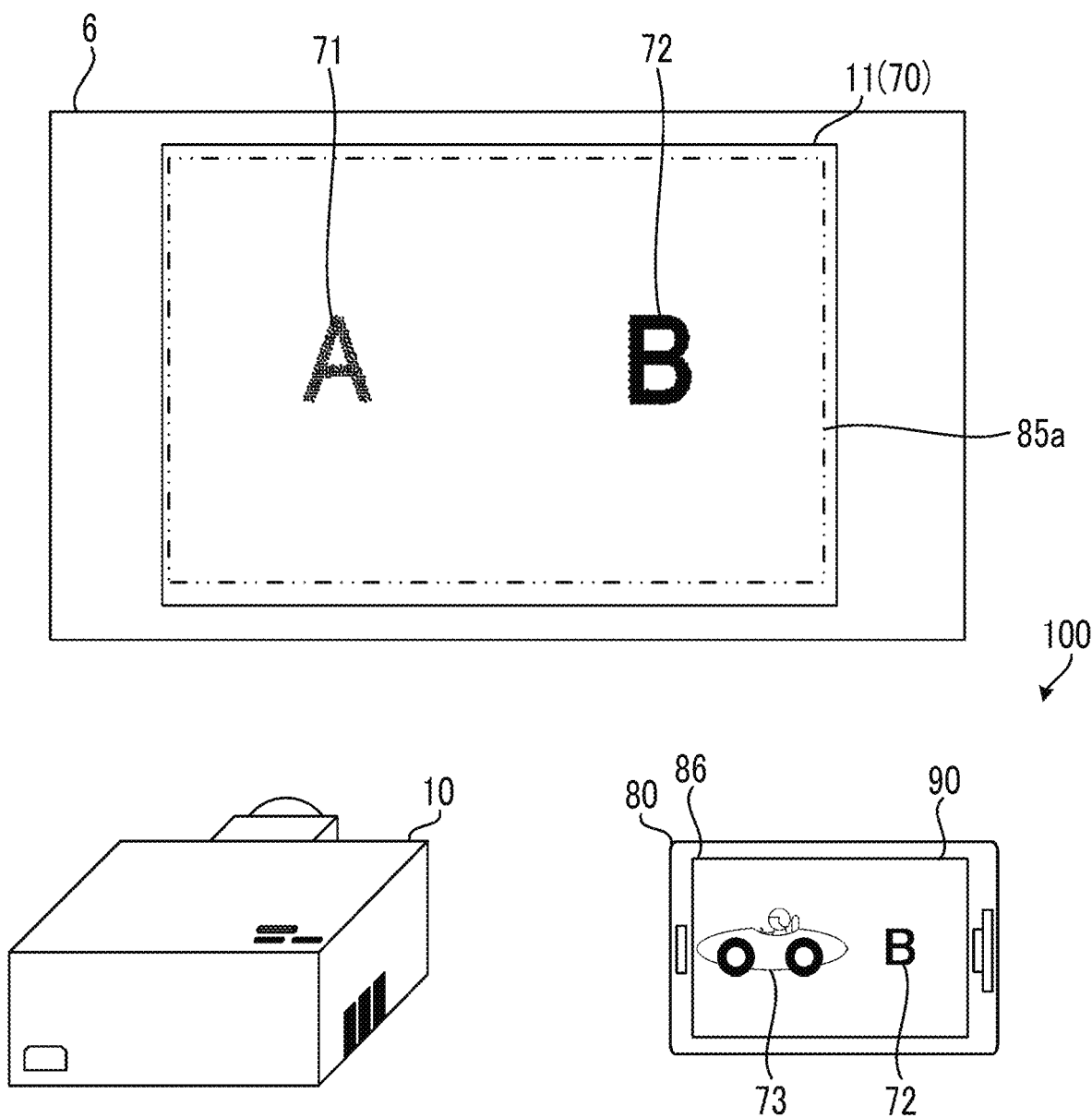
FIG. 10 is a diagram showing a second example of the change of the display aspect of the marker image 71.

FIG. 10 is a diagram showing a second example of the change of the display aspect of the marker image 71. For example, in step S15 of FIG. 8, the control device 4 performs processing of making the marker image 71 of the image 70 lighter as shown in FIG. 10. The processing of making the marker image 71 lighter is, for example, processing of making the brightness or the color of the marker image 71 close to the brightness or the color of the periphery part (background) of the marker image 71 in the image 70. Alternatively, in a case where the image 70 is an image in which the marker images 71 and 72 are superimposed on the background image, the processing of making the marker image 71 lighter may be processing of increasing the transmittance of the image 70. This processing of making the marker image 71 lighter is an example of processing of reducing the visibility of the marker image 71.

For example, by making the marker image 71 lighter in a case where the number of times of playback of the content image 73 exceeds the predetermined number of times, the visibility of the other parts of the image 70 can be increased by making the marker image 71 less conspicuous that has low necessity because the content image 73 has been sufficiently played, and by making it difficult to detect the marker image 71 in the information terminal 80, the number of times the content image 73 can be played is limited, thereby creating the premium feeling.

Third Example of Change of Display Aspect of Marker Image 71

Figure 11:
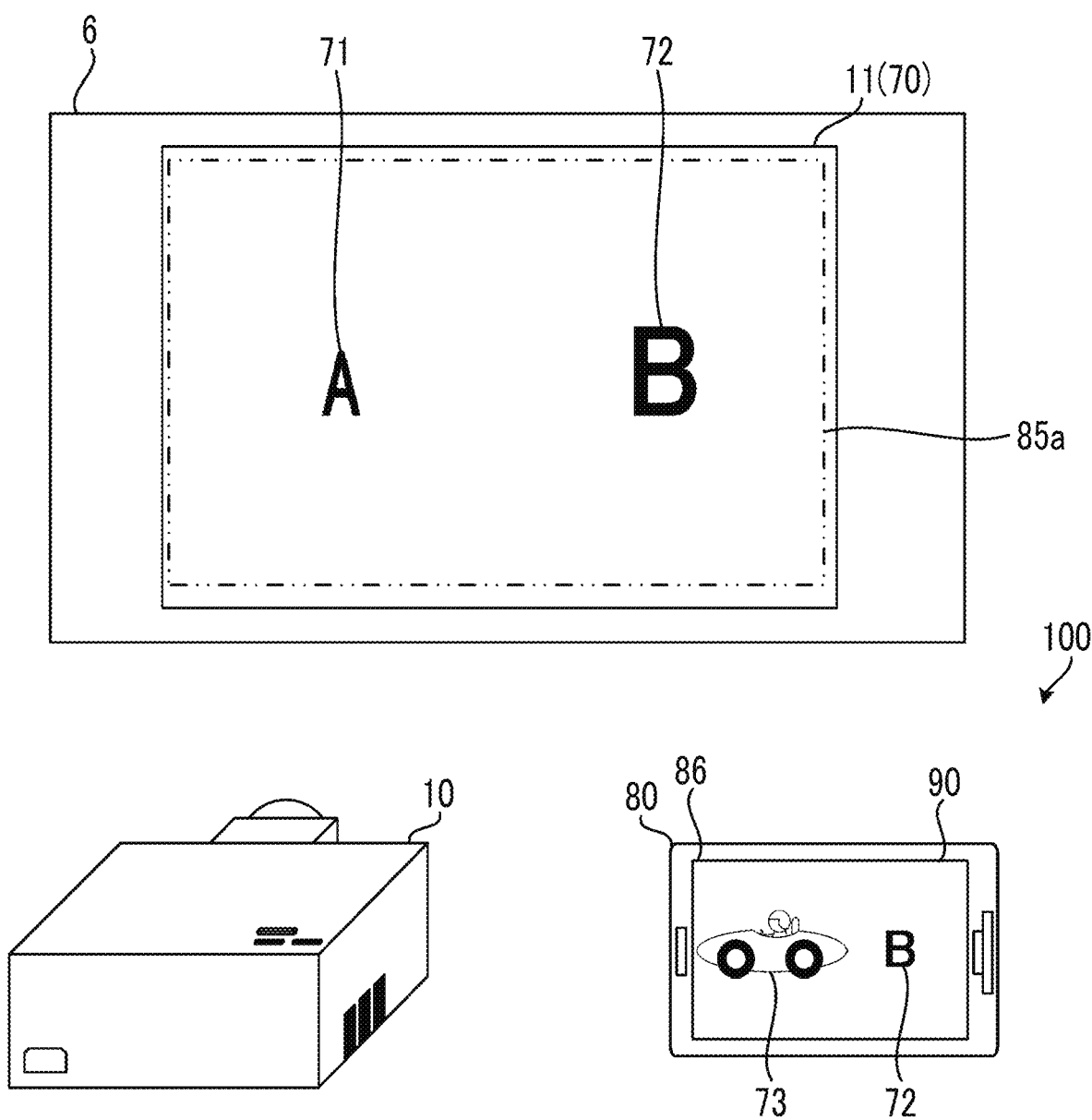
FIG. 11 is a diagram showing a third example of the change of the display aspect of the marker image 71.

FIG. 11 is a diagram showing a third example of the change of the display aspect of the marker image 71. For example, in step S15 of FIG. 8, the control device 4 performs processing of reducing the marker image 71 of the image 70 as shown in FIG. 11. This processing is an example of processing of reducing the visibility of the marker image 71.

For example, by reducing the marker image 71 in a case where the number of times of playback of the content image 73 exceeds the predetermined number of times, the visibility of the other parts of the image 70 can be increased by making the marker image 71 less conspicuous that has low necessity because the content image 73 has been sufficiently played, and by making it difficult to detect the marker image 71 in the information terminal 80, the number of times of playback of the content image 73 is limited, thereby creating the premium feeling.

As shown in FIGS. 9 to 11, in step S15 of FIG. 8, the control device 4 performs processing of reducing the visibility of the marker image 71 of the image 70. In addition, in step S15 of FIG. 8, the control device 4 may execute each processing shown in FIGS. 9 to 11 in combination with each other. For example, in step S15 of FIG. 8, the control device 4 may perform processing of making the marker image 71 of the image 70 lighter and reducing the marker image 71 of the image 70.

Fourth Example of Change of Display Aspect of Marker Image 71

Figure 12:
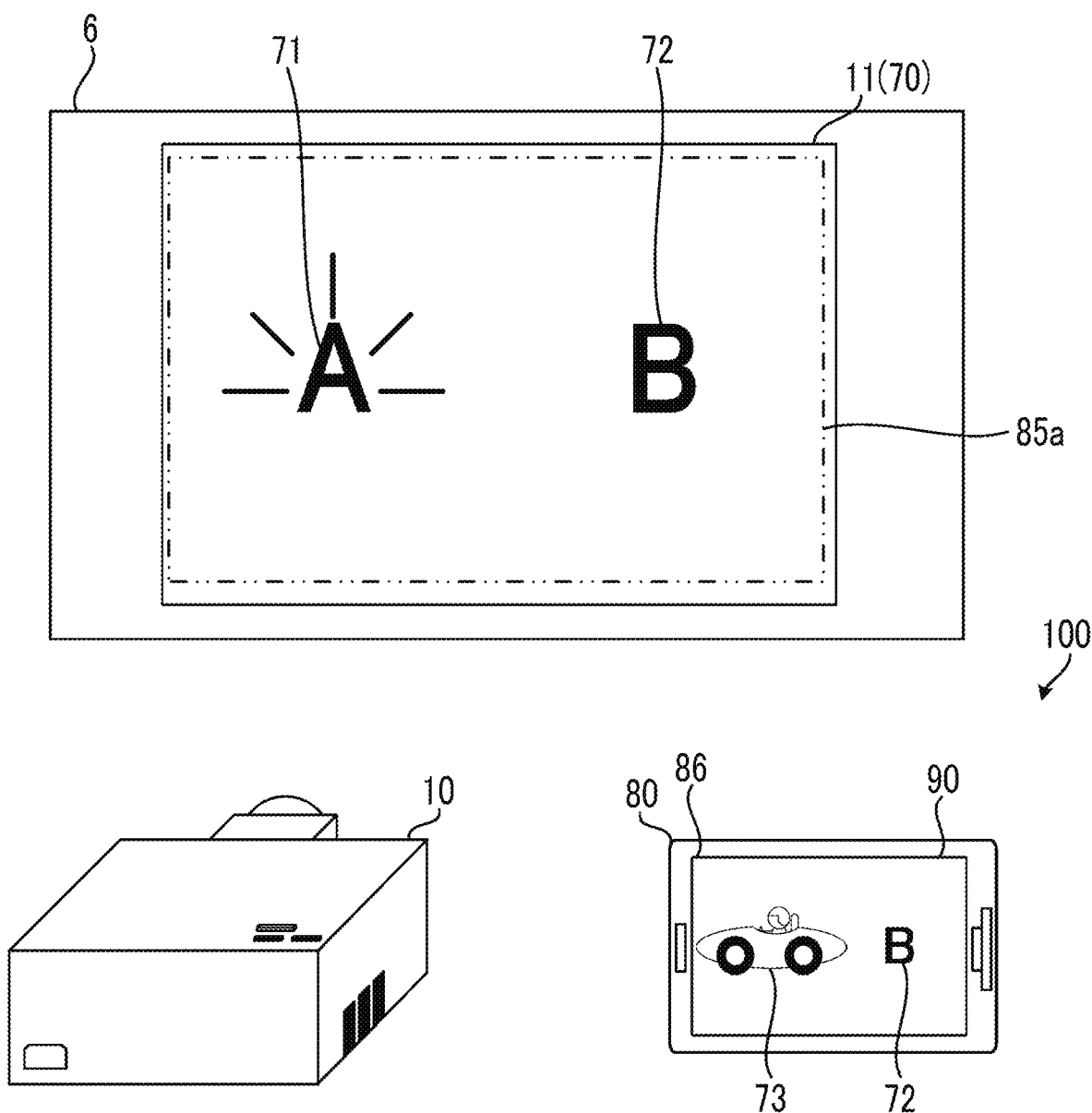
FIG. 12 is a diagram showing a fourth example of the change of the display aspect of the marker image 71.

FIG. 12 is a diagram showing a fourth example of the change of the display aspect of the marker image 71. For example, in step S15 of FIG. 8, the control device 4 performs processing of turning on and off the marker image 71 of the image 70 as shown in FIG. 12. Alternatively, in step S15 of FIG. 8, the control device 4 performs processing of superimposing an image (for example, light streaks) in which the marker image 71 appears to emit light on the image 70. Each of this processing is an example of processing of increasing the visibility of the marker image 71.

For example, by turning on and off the marker image 71, or the like in a case where the number of times of playback of the content image 73 exceeds the predetermined number of times, the observer can recognize that the content (content image 73) based on the marker image 71 is played many times, and the observer who possesses the information terminal that has not yet played the content image 73 can be effectively prompted to capture the marker image 71 and induced to play the content image 73.

Fifth Example of Change of Display Aspect of Marker Image 71

Figure 13:
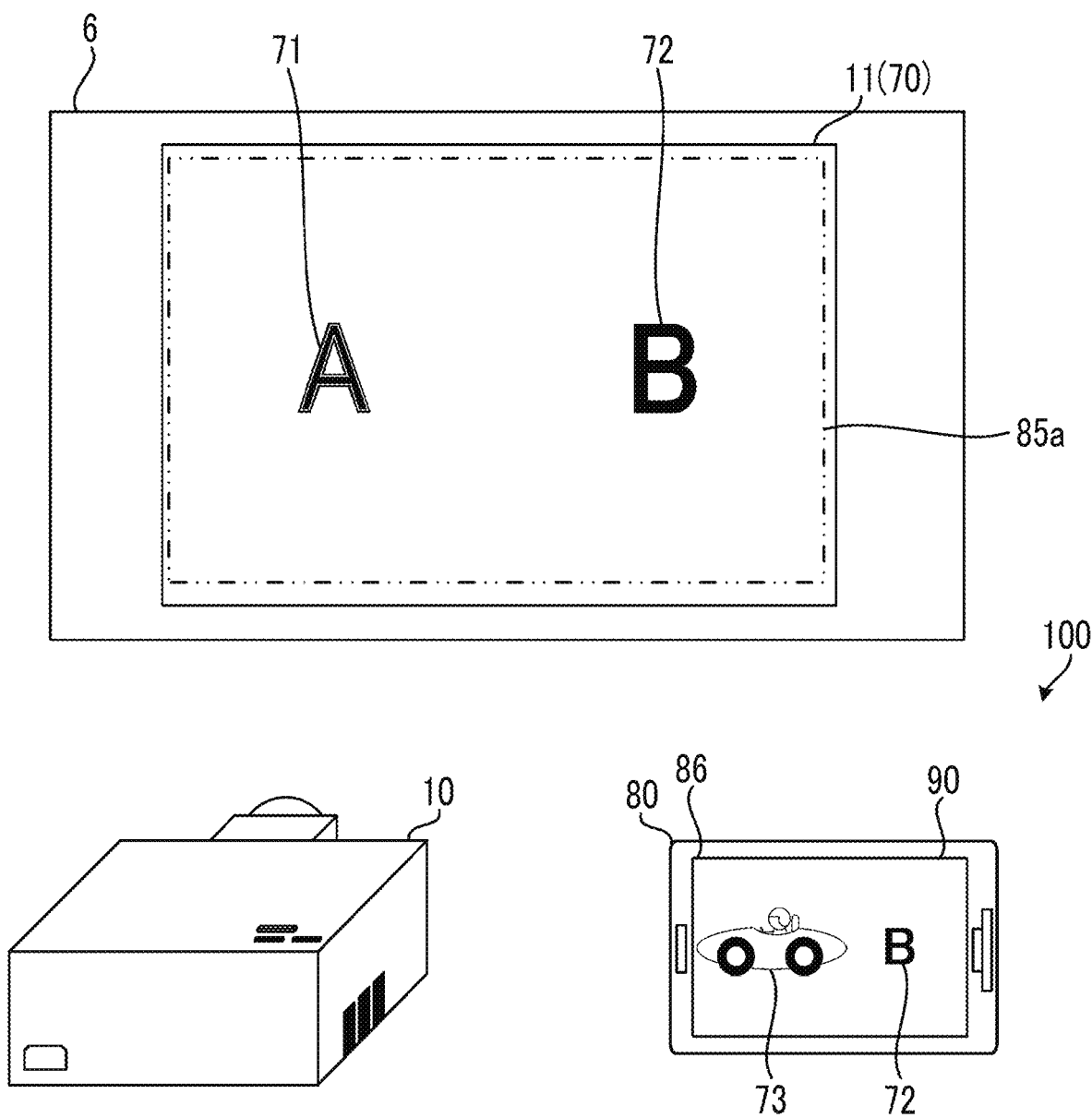
FIG. 13 is a diagram showing a fifth example of the change of the display aspect of the marker image 71.

FIG. 13 is a diagram showing a fifth example of the change of the display aspect of the marker image 71. For example, in step S15 of FIG. 8, the control device 4 performs processing of changing the color of the marker image 71 of the image 70 to a more conspicuous color or changing the font of the marker image 71 to a more conspicuous font, as shown in FIG. 13. Each of this processing is an example of processing of increasing the visibility of the marker image 71.

For example, by changing the color of the marker image 71 in a case where the number of times of playback of the content image 73 exceeds the predetermined number of times, the observer can recognize that the content (content image 73) based on the marker image 71 is played many times, and the observer who possesses the information terminal that has not yet played the content image 73 can be effectively prompted to capture the marker image 71 and induced to play the content image 73.

Sixth Example of Change of Display Aspect of Marker Image 71

Figure 14:
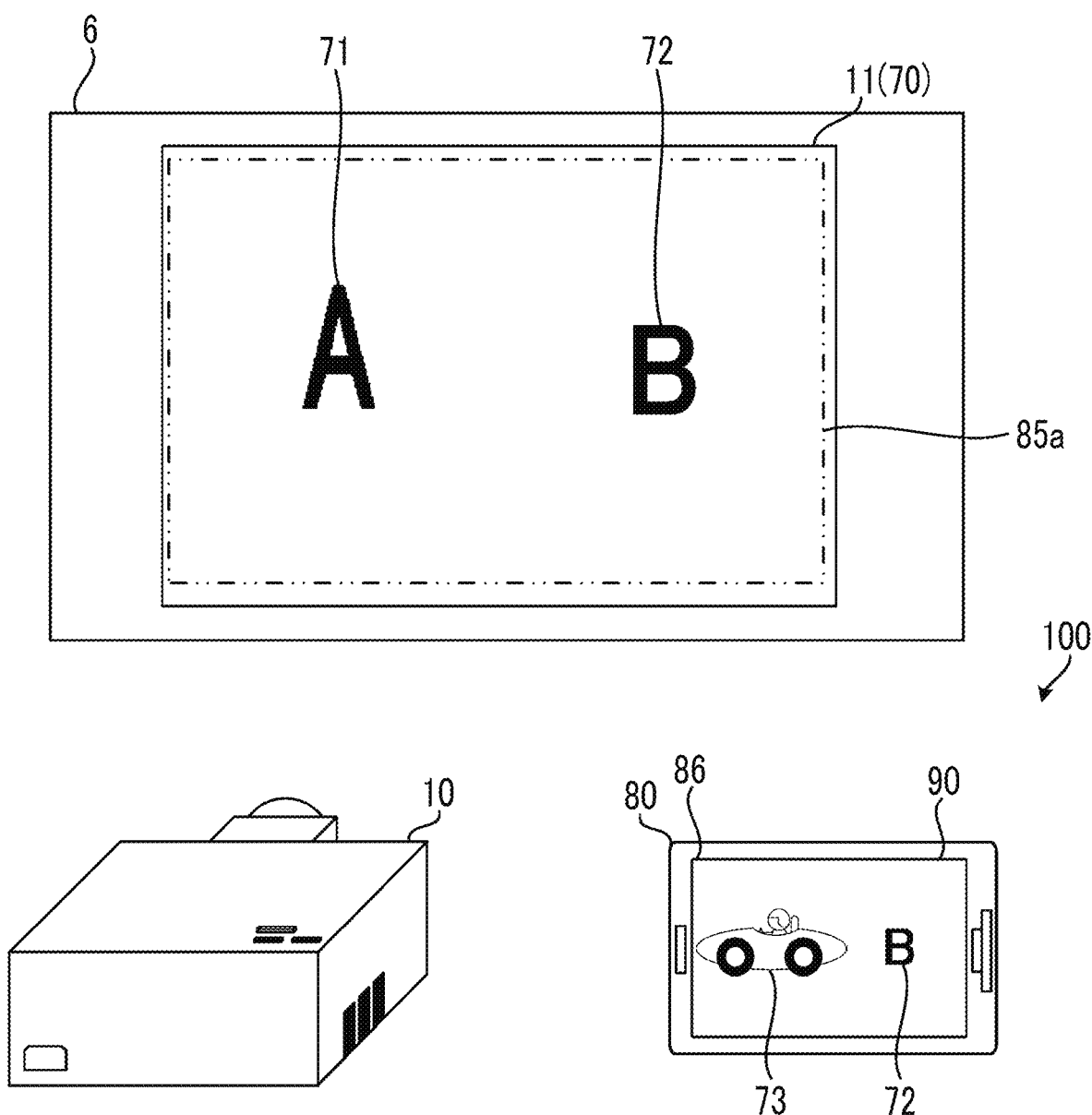
FIG. 14 is a diagram showing a sixth example of the change of the display aspect of the marker image 71.

FIG. 14 is a diagram showing a sixth example of the change of the display aspect of the marker image 71. For example, in step S15 of FIG. 8, the control device 4 performs processing of enlarging the marker image 71 of the image 70 as shown in FIG. 14. This processing is an example of processing of increasing the visibility of the marker image 71.

For example, by enlarging the marker image 71 in a case where the number of times of playback of the content image 73 exceeds the predetermined number of times, the observer can recognize that the content (content image 73) based on the marker image 71 is played many times, and the observer who possesses the information terminal that has not yet played the content image 73 can be effectively prompted to capture the marker image 71 and induced to play the content image 73.

As shown in FIGS. 12 to 14, in step S15 of FIG. 8, the control device 4 may perform processing of increasing the visibility of the marker image 71 of the image 70. In addition, in step S15 of FIG. 8, the control device 4 may execute each processing shown in FIGS. 12 to 14 in combination with each other. For example, in step S15 of FIG. 8, the control device 4 may perform processing of turning on and off the marker image 71 of the image 70, changing the color of the marker image 71 of the image 70, and enlarging the marker image 71 of the image 70.

In addition, the control device 4 may execute the processing of reducing the visibility of the marker image 71 of the image 70 shown in FIGS. 9 to 11 and the processing of increasing the visibility of the marker image 71 of the image 70 shown in FIGS. 12 to 14 in combination with each other.

As described above, with the control device 4, the visibility of the marker image 71 with which the content image 73 is associated can be changed according to the playback status of the content image 73.

<Display of Image Representing Information Regarding Number of Playback of Content Image 73>

Figure 15:
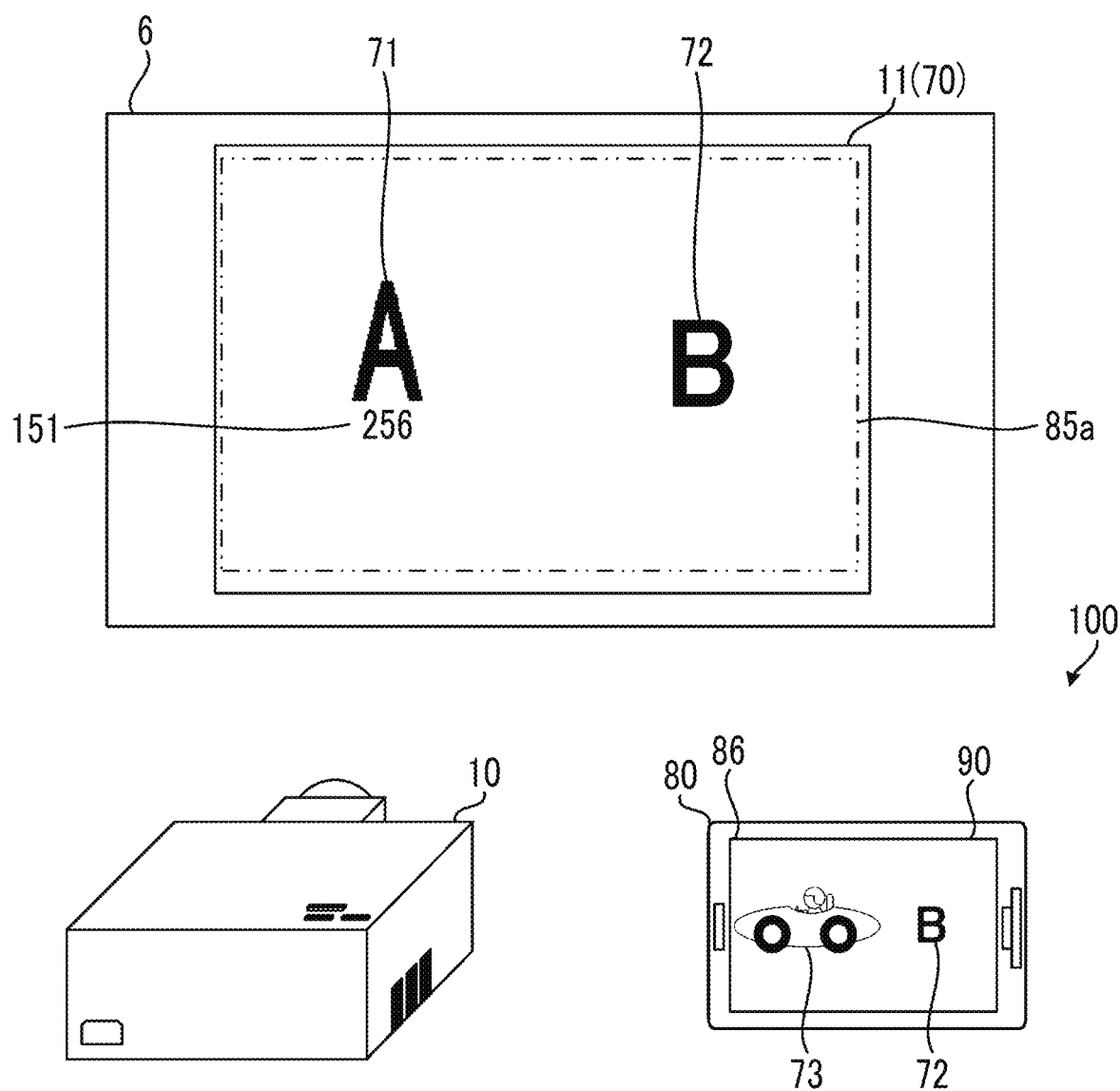
FIG. 15 is a diagram showing an example of display of an image representing information regarding the number of playback of a content image 73.

FIG. 15 is a diagram showing an example of display of an image representing the information regarding the number of playback of the content image 73. For example, in the example shown in FIG. 14, the control device 4 may superimpose and display the information regarding the number of playback of the content image 73 on the image 70. For example, as shown in FIG. 15, the control device 4 includes a number of playback image 151 indicating the number of times of playback of the content image 73 associated with the marker image 71 in the vicinity of the marker image 71 in the image 70.

In the example of FIG. 15, the number of times of playback of the content image 73 is 256, and the number of playback image 151 is an image indicating "256". Although a case of displaying the number of playback image 151 in the example of FIG. 14 has been described, the control device 4 may display the number of playback image 151 in the examples of FIGS. 9 to 13.

<Correspondence Table for Changing Display Aspect>

Figure 16:
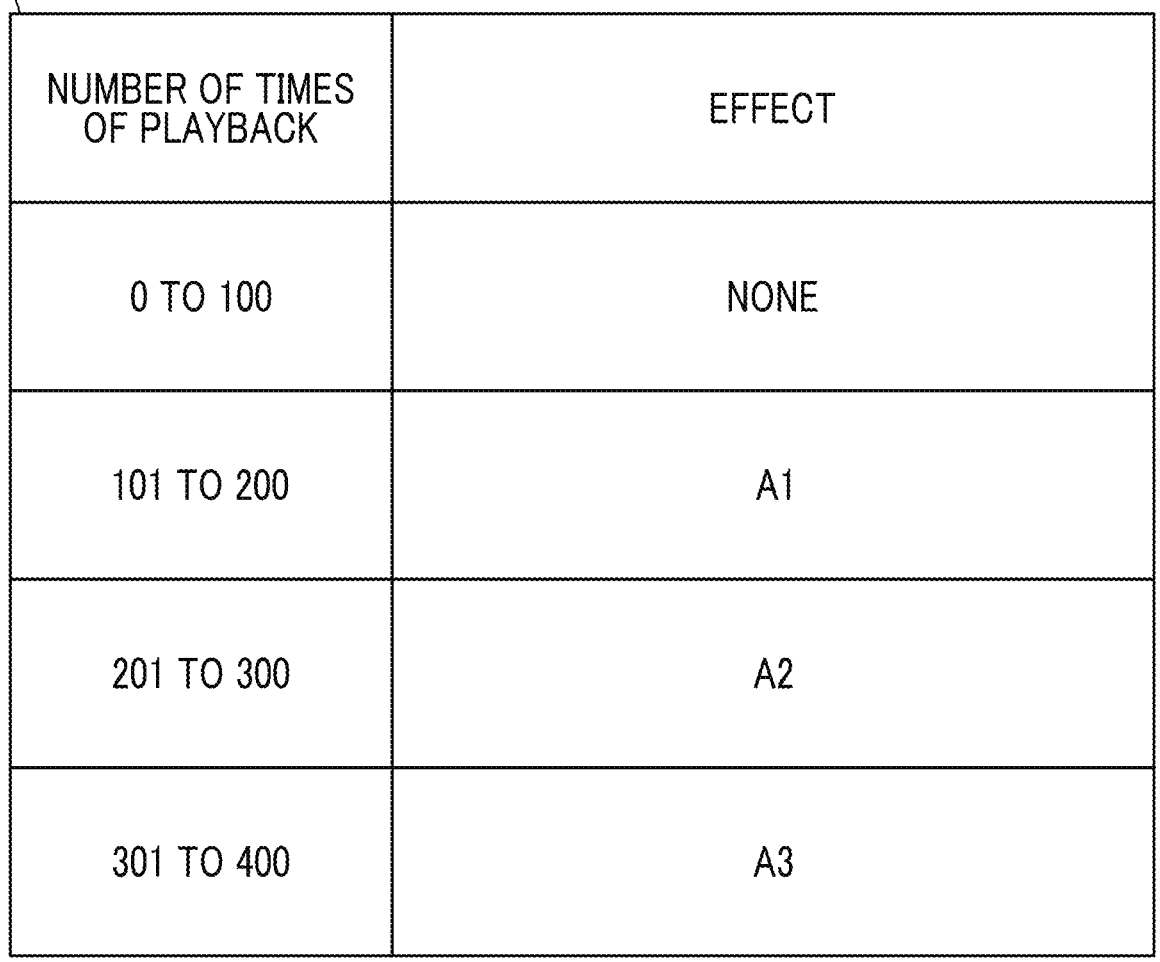
FIG. 16 is a diagram showing an example of a correspondence table for changing a display aspect.

FIG. 16 is a diagram showing an example of a correspondence table for changing a display aspect. Although a case has been described in which the display aspect of the marker image 71 is changed one time at a point in time at which the number of times of playback (information regarding the number of playback) satisfies the change condition in FIG. 8 and the like, the control device 4 may change the display aspect of the marker image 71 a plurality of times, for example, in a stepwise manner in accordance with the change in the number of times of playback.

For example, the control device 4 can acquire a correspondence table 160 shown in FIG. 16. In the correspondence table 160, the effect given to the marker image 71 is associated with each range of the number of times of playback. For example, in a range in which the number of times of playback is 0 to 100, no effect is given to the marker image 71. In a range in which the number of times of playback is 101 to 200, the effect given to the marker image 71 is A1. In a range in which the number of times of playback is 201 to 300, the effect given to the marker image 71 is A2. In a range in which the number of times of playback is 301 to 400, the effect given to the marker image 71 is A3.

The control device 4 changes the display aspect of the marker image 71 in the image 70 based on the number of times of playback of the content image 73 and on the correspondence table 160. For example, in a case where the effects A1 to A3 are effects of reducing the size of the marker image 71 to 0.8 times, 0.6 times, and 0.4 times the original size, respectively, the size of the marker image 71 can be reduced in a stepwise manner as the number of times of playback of the content image 73 is increased.

Alternatively, the control device 4 may change the display aspect of the marker image 71 in the image 70 based on the number of times of playback of the content image 73 and on a mathematical expression in which the parameter of the effect given to the marker image 71 can be calculated from the number of times of playback.

<Plurality of First Images with which Content can be Played in Different Information Terminals>

Figure 17:
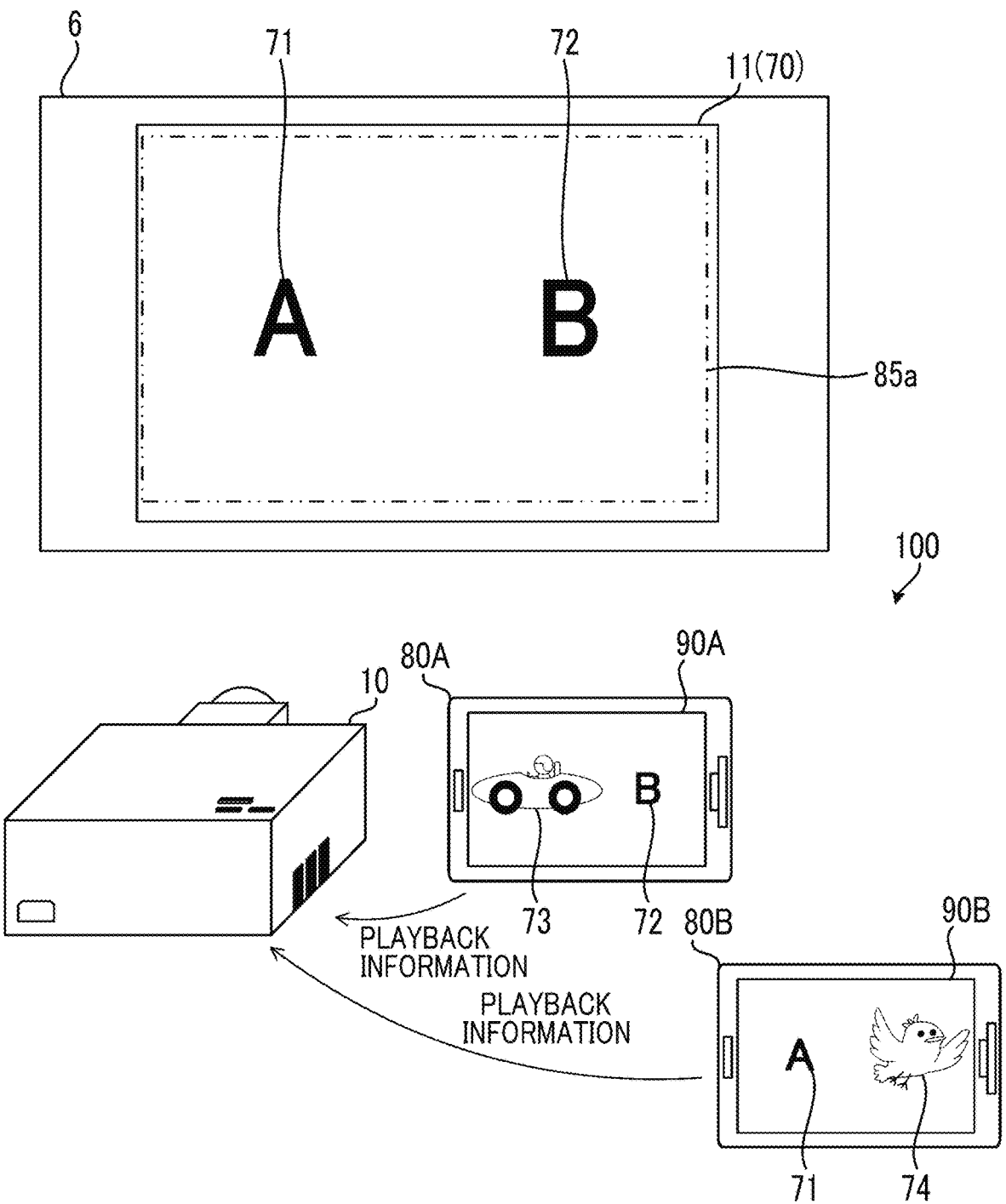
FIG. 17 is a diagram showing an example of a plurality of first images with which content can be played in different information terminals.

FIG. 17 is a diagram showing an example of a plurality of first images with which content can be played in different information terminals. For example, a content image 74 different from the content image 73 may be associated with the marker image 72, and the information terminal that can play the content may be different between the marker image 71 and the marker image 72. In the example of FIG. 17, the content image 74 is a photographic image or an illustration image of a bird. In this case, the marker image 72 is an example of a first image with which the content is associated.

For example, each of information terminals 80A and 80B shown in FIG. 17 is an information terminal that is the same as the information terminal 80. Meanwhile, the information terminal 80A plays the content image 73 in a case where the marker image 71 is detected from the captured image, but does not play the content image 74 even in a case where the marker image 72 is detected from the captured image. For example, in the state shown in FIG. 17, the information terminal 80A displays a superimposition image 90A in which the content image 73 is superimposed on the captured image.

Meanwhile, the information terminal 80B plays the content image 74 in a case where the marker image 72 is detected from the captured image, but does not play the content image 73 even in a case where the marker image 71 is detected from the captured image. For example, in the state shown in FIG. 17, the information terminal 80B displays a superimposition image 90B in which the content image 74 is superimposed on the captured image.

In this case, the control device 4 acquires the playback information for each of the marker images 71 and 72, that is, for each of the content image 73 and the content image 74. For example, the control device 4 acquires the number of times of playback of the content image 73 and the number of times of playback of the content image 74, respectively.

In a case where the number of times of playback of the content image 73 satisfies the change condition, the control device 4 changes the display aspect of the marker image 71 in the image 70, and in a case where the number of times of playback of the content image 74 satisfies the change condition, the control device 4 changes the display aspect of the marker image 72 in the image 70. As a result, the visibility of the marker image 71 can be changed according to the playback status of the content image 73, and the visibility of the marker image 72 can be changed according to the playback status of the content image 74.

The change condition for changing the display aspect of the marker image 71 and the change condition for changing the display aspect of the marker image 72 may be different from each other. In addition, the change method of the display aspect of the marker image 71 and the change method of the display aspect of the marker image 72 may be different from each other.

<Display of Attribute of Information Terminal that can Play>

Figure 18:
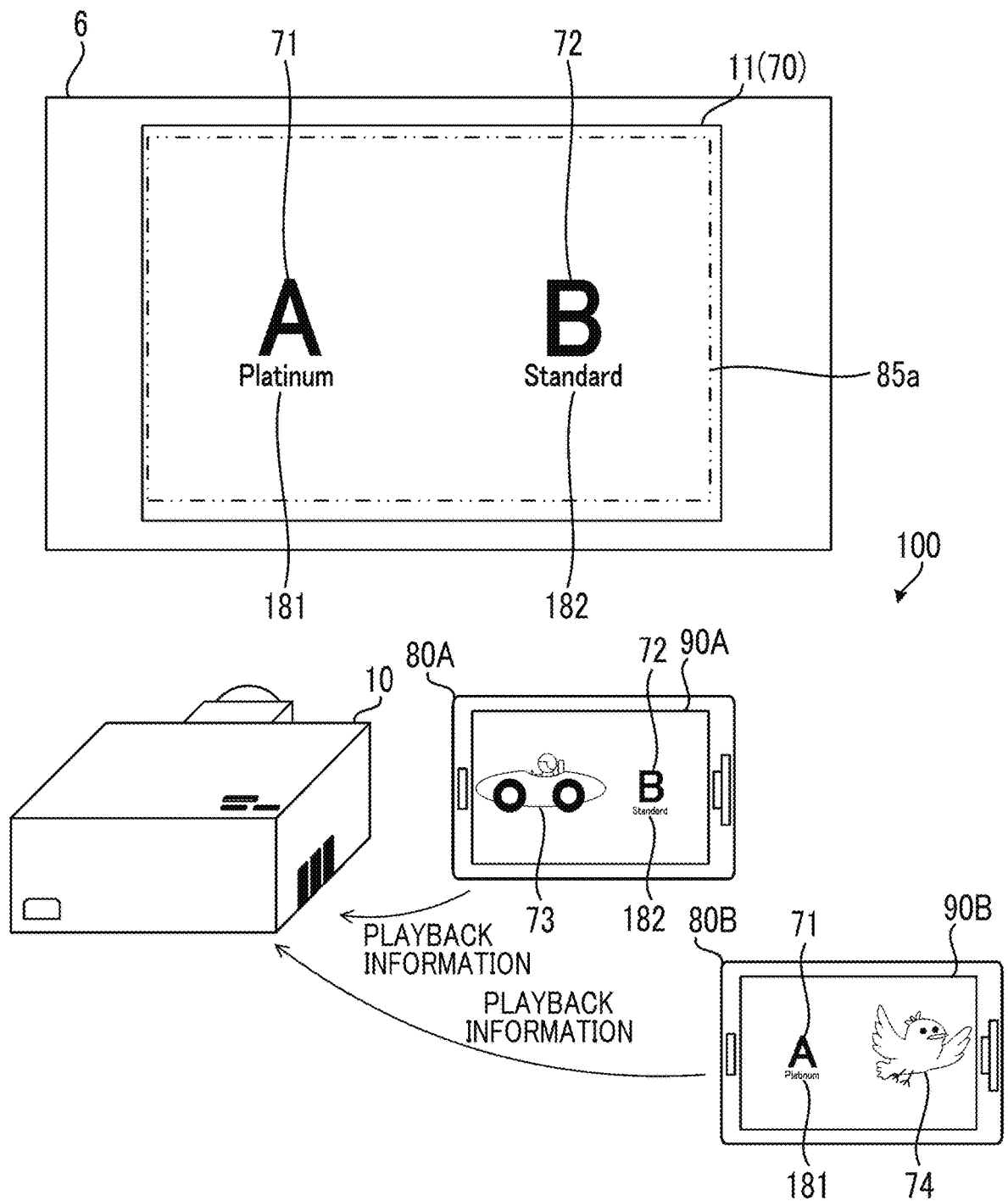
FIG. 18 is a diagram showing an example of display of an attribute of an information terminal that can play.

FIG. 18 is a diagram showing an example of display of an attribute of an information terminal that can play. The control device 4 may include an image showing an attribute of the information terminal that can play the content associated with each of the marker images 71 and 72, in the image 70. For example, it is assumed that each information terminal including the information terminals 80A and 80B can be assigned an electronic platinum ticket (A ticket) or standard ticket (B ticket) according to a contract or the like.

It is assumed that the information terminal to which the platinum ticket is assigned plays the content image 73 in a case where the marker image 71 is detected, and the information terminal to which the standard ticket is assigned plays the content image 74 in a case where the marker image 72 is detected. For example, the platinum ticket is assigned to the information terminal 80A, and the standard ticket is assigned to the information terminal 80B.

The control device 4 includes an attribute image 181 indicating that the information terminal to which the platinum ticket is assigned can play the content in the vicinity of the marker image 71 in the image 70. In the example shown in FIG. 18, the attribute image 181 is a character image of "Platinum". In addition, the control device 4 includes an attribute image 182 indicating that the information terminal to which the standard ticket is assigned can play the content in the vicinity of the marker image 72 in the image 70. In the example shown in FIG. 18, the attribute image 182 is a character image of "Standard".

As a result, the user can easily recognize the character image of the marker images 71 and 72 with which the content can be played in the information terminal possessed by the user.

Modification Example of Embodiment

Other Examples of Information Regarding Number of Playback of Content Image 73

The information regarding the number of playback of the content image 73 is not limited to the number of times of playback of the content image 73, and may be, for example, the cumulative number of playback units of the content image 73. The cumulative number of playback units of the content image 73 is the number of the information terminals that have performed playback of the content image 73. For example, as the information regarding the number of playback of the content image 73, the control device 4 calculates the number of the information terminals that are the transmission sources of the playback information received after step S11. In this case, the change condition in step S14 is, for example, that the cumulative number of playback units of the content image 73 exceeds a predetermined number.

In addition, the information regarding the number of playback of the content image 73 may be, for example, the number of simultaneous playback units of the content image 73. The number of simultaneous playback units of the content image 73 is the number of the information terminals that are simultaneously playing the content image 73. For example, the control device 4 calculates the number of simultaneous playback units of the content image 73 as the information regarding the number of playback of the content image 73 by determining whether or not the information terminal, which is the transmission source of the playback information, is currently playing the content image 73, based on the received playback information.

For example, the control device 4 performs the determination of whether or not the information terminal that is the transmission source of the playback information is currently playing the content image 73 by specifying a start time point and an end time point of the playback of the content image 73 for each information terminal that is the transmission source of the playback information. The start time point of playback of the content image 73 may be specified based on the time point at which the playback information is received, or may be specified from the playback information by including the start time point of playback of the content image 73 in the playback information. The end time point of the playback of the content image 73 may be specified from the start time point of the playback of the content image 73 in a case where the playback time length of the content image 73 is constant, or may be specified from the playback information by including the end time point of the playback of the content image 73 in the playback information. In this case, the change condition in step S14 is, for example, that the number of simultaneous playback units of the content image 73 exceeds a predetermined number.

For example, in a case where the information regarding the number of playback of the content image 73 is the information indicating an increase or a decrease, such as the number of simultaneous playback units of the content image 73, the control device 4 may change the display aspect of the marker image 71 to gradually follow the change in the information regarding the number of playback of the content image 73 in order to suppress the hatching of the display aspect of the marker image 71.

In addition, the information regarding the number of playback of the content image 73 may be information calculated from a plurality of pieces of information among the number of times of playback of the content image 73, the cumulative number of playback units of the content image 73, and the number of simultaneous playback units of the content image 73.

Although the other examples of the information regarding the number of playback of the content image 73 have been described, the same applies to the information regarding the number of playback of the content image 74.

Other Examples of Playback Method of Content

For example, although a case is described in which the information terminal 80 plays the content image 73 by reading the marker image 71, the playback method of the content image 73 is not limited to this. For example, the image 70 includes an induction image (first image) that promotes the playback of the content image 73 instead of the marker image 71 or together with the marker image 71. The user of the information terminal 80 may operate the information terminal 80 in accordance with the induction image to play the content image 73.

Other Examples of First Image

Although a case where the marker image 71 or the marker image 72 is the character image has been described, the first image with which the content is associated is not limited to the character image, and may be a figure image showing a specific shape or a pattern image such as a two-dimensional code.

Modification Example of Projection Apparatus 10

While the configuration in which the optical axis K is not bent has been described as the configuration of the projection apparatus 10 in FIGS. 4 and 5, a configuration in which the optical axis K is bent once or more by providing a reflective member in the optical unit 106 may be adopted.

Figure 19:
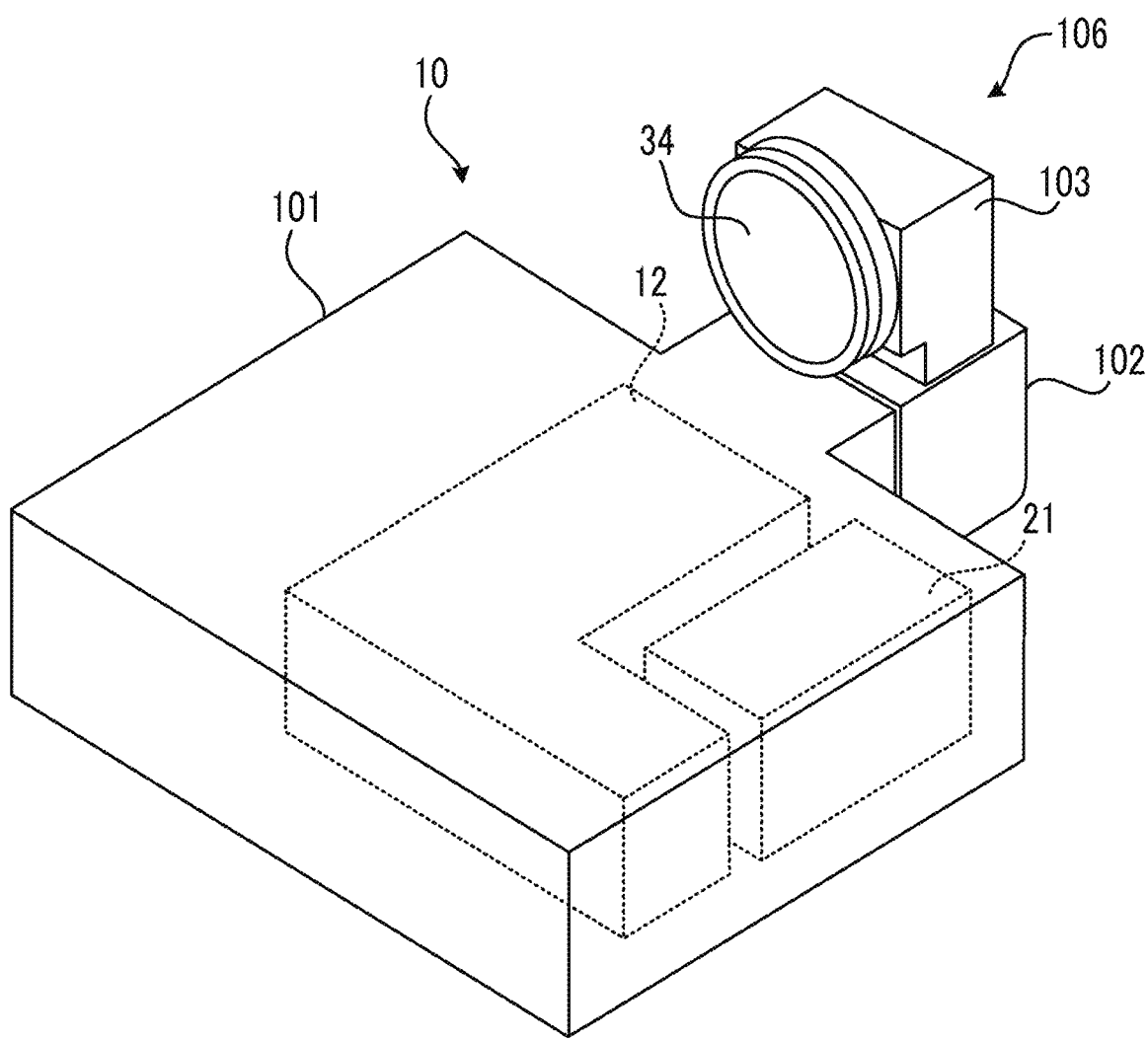
FIG. 19 is a schematic diagram showing another exterior configuration of the projection apparatus 10.
Figure 20:
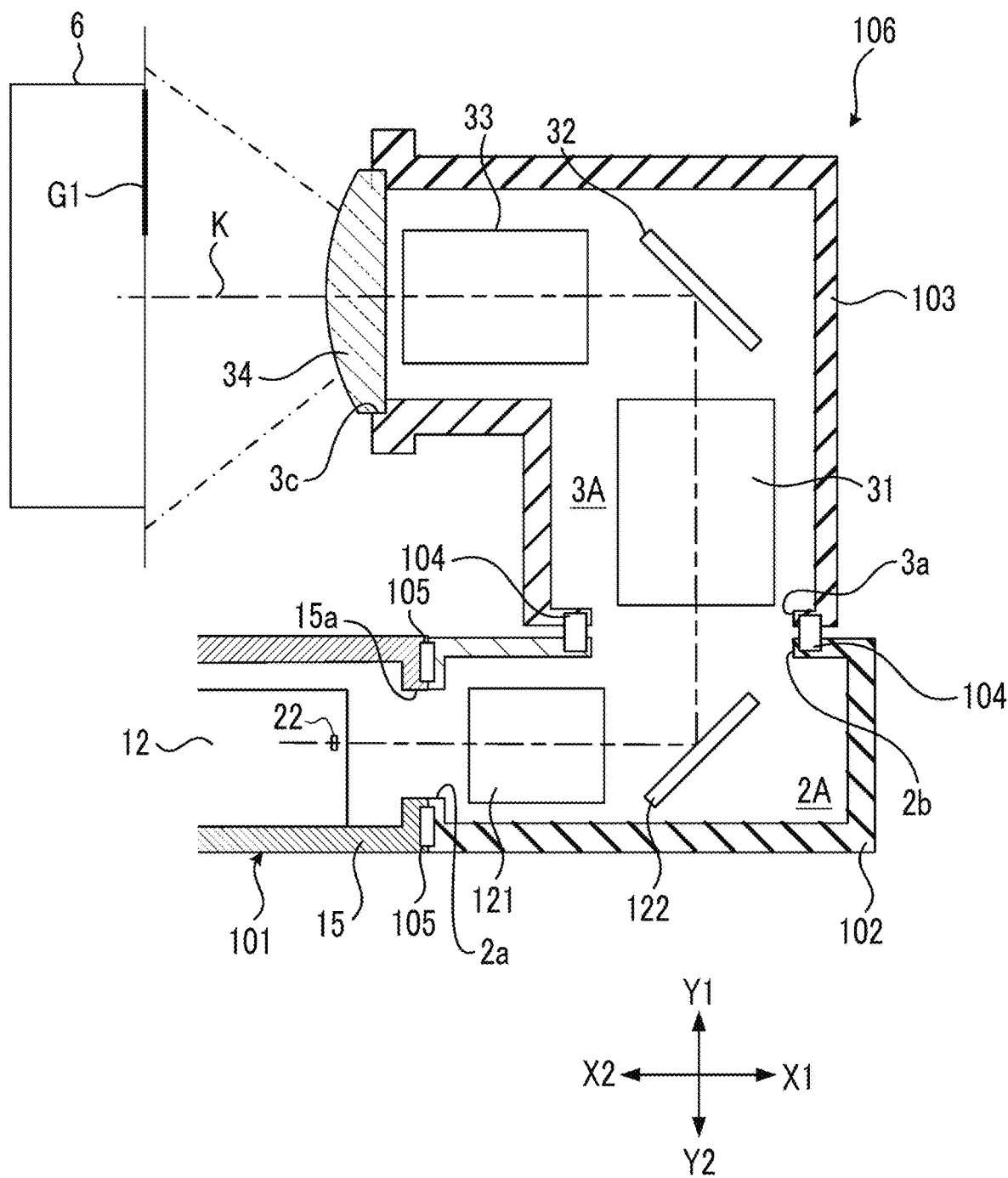
FIG. 20 is a schematic cross-sectional view of the optical unit 106 of the projection apparatus 10 shown in FIG. 19.

FIG. 19 is a schematic diagram showing another exterior configuration of the projection apparatus 10. FIG. 20 is a schematic cross-sectional view of the optical unit 106 of the projection apparatus 10 shown in FIG. 19. In FIGS. 19 and 20, the same parts as the parts illustrated in FIGS. 4 and 5 will be designated by the same reference numerals and will not be described.

As shown in FIG. 19, the optical unit 106 comprises a second member 103 supported by the first member 102 in addition to the first member 102 supported by the body part 101. The first member 102 and the second member 103 may be an integrated member.

As shown in FIG. 20, the optical unit 106 comprises, in addition to the first member 102, the second member 103 including a hollow portion 3A connected to the hollow portion 2A of the first member 102; the first optical system 121 and a reflective member 122 disposed in the hollow portion 2A; a second optical system 31, a reflective member 32, a third optical system 33, and the lens 34 disposed in the hollow portion 3A; the first shift mechanism 105; and a projection direction changing mechanism 104.

In the examples in FIGS. 19 and 20, the opening 2a and the opening 2b of the first member 102 are formed in surfaces perpendicular to each other. In addition, the projection optical system 23 shown in FIGS. 19 and 20 is composed of the reflective member 122, the second optical system 31, the reflective member 32, and the third optical system 33 in addition to the first optical system 121 and the lens 34 shown in FIGS. 4 and 5. With such a projection optical system 23, as shown in FIG. 20, the optical axis K is bent twice to be folded. The first optical system 121, the reflective member 122, the second optical system 31, the reflective member 32, the third optical system 33, and the lens 34 are disposed in this order from an optical modulation portion 22 side along the optical axis K.

The first optical system 121 guides the light that is incident on the first member 102 from the body part 101 and that travels in the direction X1 to the reflective member 122. The reflective member 122 reflects the light incident from the first optical system 121 in the direction Y1. The reflective member 122 is composed of, for example, a mirror. In the first member 102, the opening 2b is formed on an optical path of the light reflected by the reflective member 122, and the reflected light travels to the hollow portion 3A of the second member 103 by passing through the opening 2b.

The second member 103 is a member having an approximately L-shaped cross-sectional exterior, in which an opening 3a is formed at a position facing the opening 2b of the first member 102. The light from the body part 101 that has passed through the opening 2b of the first member 102 is incident into the hollow portion 3A of the second member 103 through the opening 3a. The first member 102 and the second member 103 may have any cross-sectional exterior and are not limited to the above.

The second optical system 31 includes at least one lens and guides the light incident from the first member 102 to the reflective member 32. The reflective member 32 guides the light incident from the second optical system 31 to the third optical system 33 by reflecting the light in the direction X2. The reflective member 32 is composed of, for example, a mirror. The third optical system 33 includes at least one lens and guides the light reflected by the reflective member 32 to the lens 34.

The lens 34 closes an opening 3c formed in an end part of the second member 103 on a direction X2 side and is disposed in the end part. The lens 34 projects the light incident from the third optical system 33 to the projection target object 6.

FIG. 20 shows a state where the first member 102 is moved as far as possible to a direction Y1 side by the first shift mechanism 105. By moving the first member 102 in the direction Y2 via the first shift mechanism 105 from the state shown in FIG. 20, the relative position between a center of the image formed by the optical modulation portion 22 and the optical axis K changes, and the image G1 projected to the projection target object 6 can be shifted in the direction Y1.

The projection direction changing mechanism 104 is a rotation mechanism that rotatably connects the second member 103 to the first member 102. By the projection direction changing mechanism 104, the second member 103 is configured to be rotatable about a rotation axis (specifically, the optical axis K) that extends in the direction Y. The projection direction changing mechanism 104 is not limited to a disposition position shown in FIG. 20 as long as the projection direction changing mechanism 104 can rotate the optical system. In addition, the number of rotation mechanisms is not limited to one, and a plurality of rotation mechanisms may be provided.

Modification Example of Control Device

Although a case in which the control device according to the embodiment of the present invention is applied to the control device 4 of the projection apparatus 10 has been described, the present invention is not limited to such a configuration.

Figure 21:
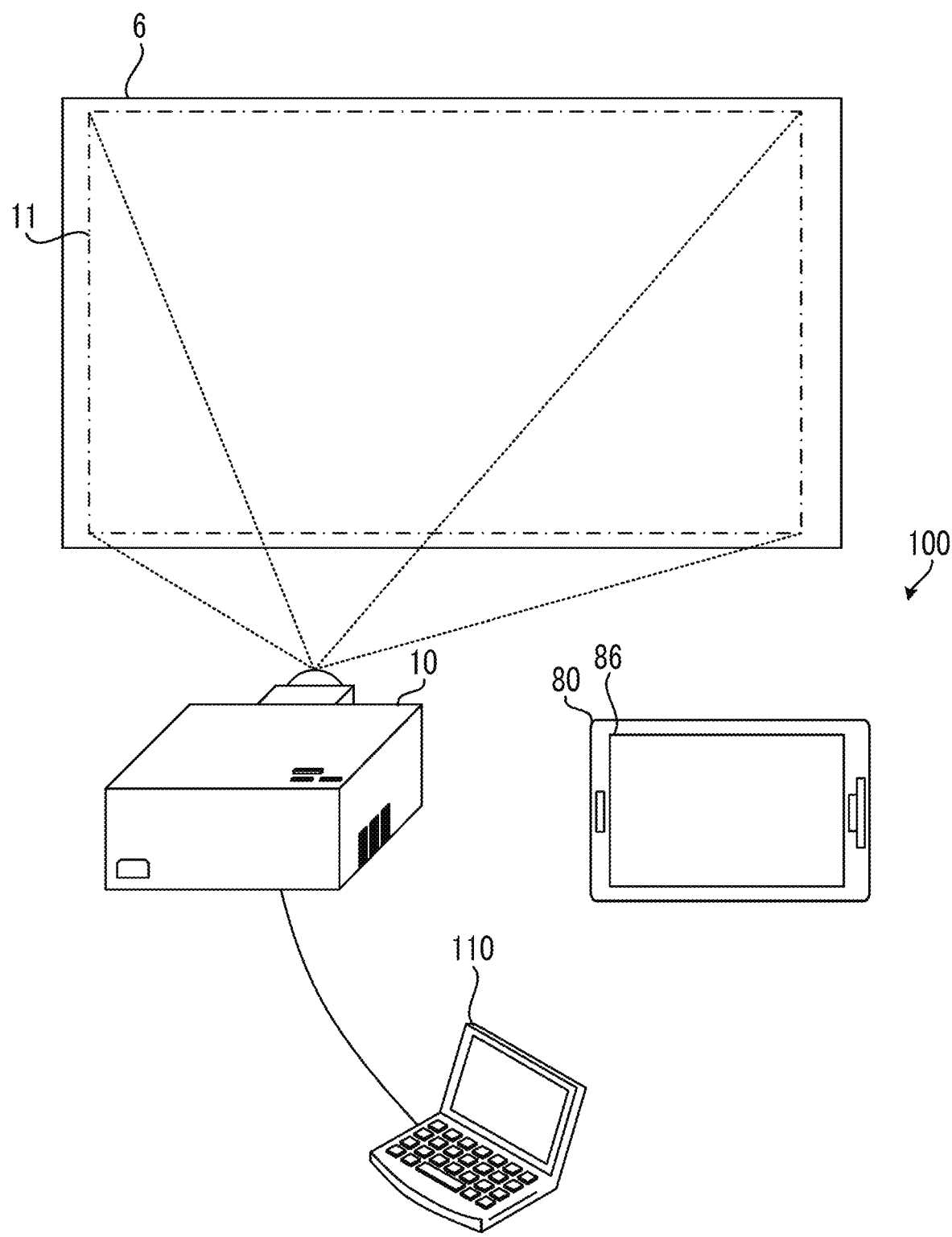
FIG. 21 is a diagram showing a modification example of the system 100.

FIG. 21 is a diagram showing a modification example of the system 100. In the system 100 shown in FIG. 21, an information terminal 110 is included in addition to the configuration of the system 100 shown in FIG. 1. The control device according to the embodiment of the present invention may be applied to the information terminal 110.

The information terminal 110 is an information terminal that can directly or indirectly communicate with the projection apparatus 10. The communication between the information terminal 110 and the projection apparatus 10 may be wired communication or wireless communication. The information terminal 110 communicates with the projection apparatus 10 to execute various types of control performed by the control device 4. In the example of FIG. 21, the information terminal 110 is a notebook-type personal computer, but the information terminal 110 can be various information terminals such as a desktop-type personal computer, a smartphone, and a tablet terminal.

For example, the information terminal 110 controls the projection apparatus 10 to project the image 70, and also receives the playback information about the content image 73 from the information terminals such as the information terminal 80 and performs control to change the display aspect of the marker image 71 in the image 70 based on the received playback information.

Figure 22:
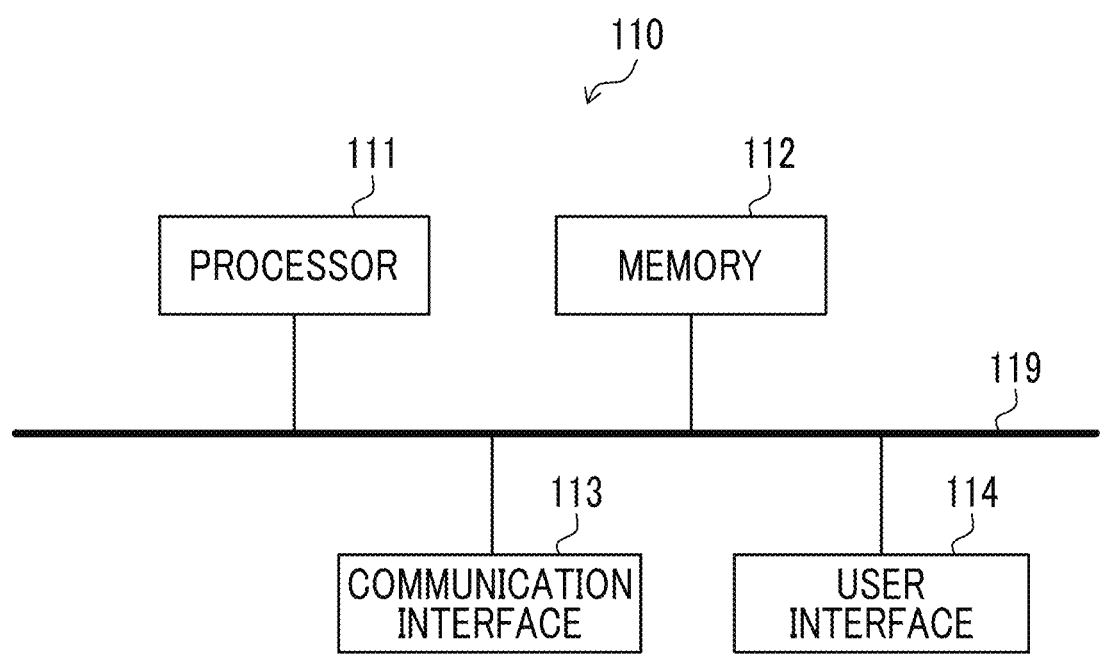
FIG. 22 is a diagram showing an example of a hardware configuration of an information terminal 110.

FIG. 22 is a diagram showing an example of a hardware configuration of the information terminal 110. As shown in FIG. 22, the information terminal 110 shown in FIG. 1 comprises a processor 111, a memory 112, a communication interface 113, and a user interface 114. The processor 111, the memory 112, the communication interface 113, and the user interface 114 are connected by, for example, a bus 119. The processor 111, the memory 112, the communication interface 113, and the user interface 114 have the same configurations as the processor 81, the memory 82, the communication interface 83, and the user interface 84 shown in FIG. 6, respectively.

Other Examples of Content

Although images such as the content images 73 and 74 have been described as the example of the content associated with the image 70, the content associated with the image 70 is not limited to the images. For example, the content associated with the image 70 may be content other than the image that can be played by the information terminal 80, such as voice or vibration.

Although various embodiments have been described above, it is needless to say that the present invention is not limited to such examples. It is apparent that those skilled in the art may perceive various modification examples or correction examples within the scope disclosed in the claims, and those examples are also understood as falling within the technical scope of the present invention. In addition, each constituent in the embodiment may be used in any combination without departing from the gist of the invention.

The present application is based on Japanese Patent Application (JP2022-081604) filed on May 18, 2022, the content of which is incorporated in the present application by reference.

EXPLANATION OF REFERENCES

1: projection portion
2: operation reception portion
2A, 3A: hollow portion
2a, 2b, 3a, 3c, 15a: opening
4: control device
4a: storage medium
5: communication portion
6: projection target object
10: projection apparatus
11: projection range
12: optical modulation unit
15: housing
21: light source
22: optical modulation portion
23: projection optical system
24: control circuit
31: second optical system
32, 122: reflective member
33: third optical system
34: lens
70: image
71, 72: marker image
73, 74: content image
80, 80A, 80B, 110: information terminal
81, 111: processor
82, 112: memory
83, 113: communication interface
84, 114: user interface
85: imaging module
85a: imaging range
86: display unit
89, 119: bus
90, 90A, 90B: superimposition image
100: system
101: body part
102: first member
103: second member
104: projection direction changing mechanism
105: first shift mechanism
106: optical unit
121: first optical system
151: number of playback image
160: correspondence table
181, 182: attribute image
G1: image

What is claimed is:

1. A control device comprising a processor,
wherein the processor is configured to:
   cause a second image including a first image with which content is associated to be projected from a projection apparatus;
   acquire playback information regarding playback of the content via an information terminal; and
   change a display aspect of the first image in the second image based on the playback information.

2. The control device according to claim 1,
wherein the change of the display aspect of the first image is a process for changing visibility of the first image.

3. The control device according to claim 2,
wherein the change of the display aspect of the first image is a process for reducing the visibility of the first image.

4. The control device according to claim 2,
wherein the change of the display aspect of the first image is a process for increasing the visibility of the first image.

5. The control device according to claim 1,
wherein the playback information is information regarding the number of times of playback of the content.

6. The control device according to claim 5,
wherein the information regarding the number of times of playback of the content includes information indicating the number of times one or more information terminals have played the content.

7. The control device according to claim 5,
wherein the information regarding the number of times of playback of the content includes information indicating the number of information terminals that have performed the playback of the content.

8. The control device according to claim 5,
wherein the information regarding the number of times of playback of the content includes information indicating the number of information terminals that are simultaneously playing the content.

9. The control device according to claim 5,
wherein the second image includes an image representing the information regarding the number of times of playback of the content.

10. The control device according to claim 1,
wherein the first image includes a plurality of first images that are playable in different information terminals, and
the processor is configured to acquire the playback information for the plurality of first images.

11. A control method executed by a processor of a control device, the method comprising:
- causing a second image including a first image with which content is associated to be projected from a projection apparatus;
- acquiring playback information regarding playback of the content via an information terminal; and
- changing a display aspect of the first image in the second image based on the playback information.

12. A non-transitory computer-readable storage medium that stores a control program for causing a processor of a control device to execute a process, the process comprising:
- causing a second image including a first image with which content is associated to be projected from a projection apparatus;
- acquiring playback information regarding playback of the content via an information terminal; and
- changing a display aspect of the first image in the second image based on the playback information.

13. A system comprising:
- a control device configured to cause a second image including a first image with which content is associated to be projected from a projection apparatus, acquire playback information regarding playback of the content via an information terminal, and change a display aspect of the first image in the second image based on the playback information;
- the projection apparatus; and
- the information terminal.

* * * * *